(12) United States Patent
Laffargue et al.

(10) Patent No.: US 9,007,368 B2
(45) Date of Patent: Apr. 14, 2015

(54) DIMENSIONING SYSTEM CALIBRATION SYSTEMS AND METHODS

(75) Inventors: Franck Laffargue, Toulouse (FR); Patrice Thebault, Lapeyrouse-Fossat (FR); Jeffrey Mark Hunt, Kirkland, WA (US)

(73) Assignee: INTERMEC IP Corp., Everett, WA (US)

( * ) Notice: Subject to any disclaimer, the term of this patent is extended or adjusted under 35 U.S.C. 154(b) by 407 days.

(21) Appl. No.: 13/465,968

(22) Filed: May 7, 2012

(65) Prior Publication Data

US 2013/0293540 A1 Nov. 7, 2013

(51) Int. Cl.
*G06T 17/00* (2006.01)
*G06T 17/20* (2006.01)

(52) U.S. Cl.
CPC ..................................... *G06T 17/20* (2013.01)

(58) Field of Classification Search
CPC ....................................................... G06T 17/00
See application file for complete search history.

(56) References Cited

U.S. PATENT DOCUMENTS

| | | |
|---|---|---|
| 3,971,065 A | 7/1976 | Bayer |
| 4,398,811 A | 8/1983 | Nishioka et al. |
| 4,730,190 A | 3/1988 | Win et al. |
| 5,220,536 A | 6/1993 | Stringer et al. |
| 5,331,118 A | 7/1994 | Jensen |
| 5,359,185 A | 10/1994 | Hanson |
| 5,548,707 A | 8/1996 | LoNegro |
| 5,555,090 A | 9/1996 | Schmutz |
| 5,590,060 A | 12/1996 | Granville et al. |
| 5,655,095 A | 8/1997 | LoNegro et al. |
| 5,661,561 A | 8/1997 | Wurz et al. |
| 5,699,161 A | 12/1997 | Woodworth |
| 5,729,750 A | 3/1998 | Ishida |
| 5,734,476 A | 3/1998 | Dlugos |
| 5,831,737 A | 11/1998 | Stringer et al. |

(Continued)

FOREIGN PATENT DOCUMENTS

| | | |
|---|---|---|
| DE | 10210813 A1 | 10/2003 |
| DE | 102007037282 A1 | 3/2008 |

(Continued)

OTHER PUBLICATIONS

International Search Report for PCT/US2013/039438 (WO2013166368), Oct. 1, 2013, 7 pages.

(Continued)

*Primary Examiner* — Mark Zimmerman
*Assistant Examiner* — Michelle Chin
(74) *Attorney, Agent, or Firm* — Additon, Higgins & Pendleton, P.A.

(57) ABSTRACT

Systems and methods of determining the volume and dimensions of a three-dimensional object using a dimensioning system are provided. The dimensioning system can include an image sensor, a non-transitory, machine-readable, storage, and a processor. The dimensioning system can select and fit a three-dimensional packaging wireframe model about each three-dimensional object located within a first point of view of the image sensor. Calibration is performed to calibrate between image sensors of the dimensioning system and those of the imaging system. Calibration may occur pre-run time, in a calibration mode or period. Calibration may occur during a routine. Calibration may be automatically triggered on detection of a coupling between the dimensioning and the imaging systems.

19 Claims, 6 Drawing Sheets

(56) References Cited

U.S. PATENT DOCUMENTS

| | | |
|---|---|---|
| 5,850,370 A | 12/1998 | Stringer et al. |
| 5,869,827 A | 2/1999 | Rando |
| 5,870,220 A | 2/1999 | Migdal et al. |
| 5,900,611 A | 5/1999 | Hecht |
| 5,923,428 A | 7/1999 | Woodworth |
| 5,929,856 A | 7/1999 | LoNegro et al. |
| 5,969,823 A | 10/1999 | Wurz et al. |
| 5,978,512 A | 11/1999 | Kim et al. |
| 5,979,760 A | 11/1999 | Freyman et al. |
| 5,991,041 A | 11/1999 | Woodworth |
| 6,049,386 A | 4/2000 | Stringer et al. |
| 6,053,409 A | 4/2000 | Brobst et al. |
| 6,064,759 A | 5/2000 | Buckley et al. |
| 6,069,696 A | 5/2000 | McQueen et al. |
| 6,137,577 A | 10/2000 | Woodworth |
| 6,177,999 B1 | 1/2001 | Wurz et al. |
| 6,246,468 B1 | 6/2001 | Dimsdale |
| 6,336,587 B1 | 1/2002 | He et al. |
| 6,373,579 B1 | 4/2002 | Ober et al. |
| 6,457,642 B1 | 10/2002 | Good et al. |
| 6,517,004 B2 | 2/2003 | Good et al. |
| 6,674,904 B1 | 1/2004 | McQueen |
| 6,705,526 B1 | 3/2004 | Zhu et al. |
| 6,824,058 B2 | 11/2004 | Patel et al. |
| 6,832,725 B2 | 12/2004 | Gardiner et al. |
| 6,858,857 B2 | 2/2005 | Pease et al. |
| 6,971,580 B2 | 12/2005 | Zhu et al. |
| 7,085,409 B2 | 8/2006 | Sawhney et al. |
| 7,086,162 B2 | 8/2006 | Tyroler |
| 7,104,453 B1 | 9/2006 | Zhu et al. |
| 7,128,266 B2 | 10/2006 | Marlton et al. |
| 7,159,783 B2 | 1/2007 | Walczyk et al. |
| 7,277,187 B2 | 10/2007 | Smith et al. |
| 7,307,653 B2 | 12/2007 | Dutta |
| 7,413,127 B2 | 8/2008 | Ehrhart et al. |
| 7,527,205 B2 | 5/2009 | Zhu |
| 7,586,049 B2 | 9/2009 | Wurz |
| 7,726,575 B2 | 6/2010 | Wang et al. |
| 7,788,883 B2 | 9/2010 | Buckley et al. |
| 7,974,025 B2 | 7/2011 | Topliss |
| 8,027,096 B2 | 9/2011 | Feng et al. |
| 8,028,501 B2 | 10/2011 | Buckley et al. |
| 8,050,461 B2 | 11/2011 | Shpunt et al. |
| 8,055,061 B2 | 11/2011 | Katano |
| 8,102,395 B2 | 1/2012 | Kondo et al. |
| 8,132,728 B2 | 3/2012 | Dwinell et al. |
| 8,134,717 B2 | 3/2012 | Pangrazio et al. |
| 8,212,889 B2 | 7/2012 | Chanas et al. |
| 8,228,510 B2 | 7/2012 | Pangrazio et al. |
| 8,294,969 B2 | 10/2012 | Plesko |
| 8,305,458 B2 | 11/2012 | Hara |
| 8,310,656 B2 | 11/2012 | Zalewski |
| 8,313,380 B2 | 11/2012 | Zalewski et al. |
| 8,317,105 B2 | 11/2012 | Kotlarsky et al. |
| 8,322,622 B2 | 12/2012 | Suzhou et al. |
| 8,339,462 B2 | 12/2012 | Stec et al. |
| 8,350,959 B2 | 1/2013 | Topliss et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,976 B2 | 2/2013 | Mohideen et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,437,539 B2 | 5/2013 | Komatsu et al. |
| 8,441,749 B2 | 5/2013 | Brown et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,570,343 B2 | 10/2013 | Halstead |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 2002/0118874 A1 | 8/2002 | Chung et al. |
| 2002/0179708 A1 | 12/2002 | Zhu et al. |
| 2003/0038179 A1 | 2/2003 | Tsikos et al. |
| 2003/0053513 A1 | 3/2003 | Vatan et al. |
| 2003/0091227 A1 | 5/2003 | Chang et al. |
| 2003/0156756 A1* | 8/2003 | Gokturk et al. .............. 382/190 |

(56) References Cited

U.S. PATENT DOCUMENTS

| | | |
|---|---|---|
| 2004/0155975 A1 | 8/2004 | Hart et al. |
| 2004/0165090 A1 | 8/2004 | Ning |
| 2004/0211836 A1 | 10/2004 | Patel et al. |
| 2004/0233461 A1 | 11/2004 | Armstrong et al. |
| 2005/0117215 A1 | 6/2005 | Lange |
| 2005/0128193 A1 | 6/2005 | Popescu et al. |
| 2006/0151604 A1 | 7/2006 | Zhu et al. |
| 2006/0159307 A1 | 7/2006 | Anderson et al. |
| 2006/0232681 A1 | 10/2006 | Okada |
| 2006/0269165 A1 | 11/2006 | Viswanathan |
| 2007/0031064 A1* | 2/2007 | Zhao et al. ............ 382/285 |
| 2007/0063048 A1 | 3/2007 | Havens et al. |
| 2007/0181685 A1 | 8/2007 | Zhu et al. |
| 2007/0237356 A1 | 10/2007 | Dwinell et al. |
| 2008/0013793 A1 | 1/2008 | Hillis et al. |
| 2008/0035390 A1 | 2/2008 | Wurz |
| 2008/0056536 A1 | 3/2008 | Hildreth et al. |
| 2008/0164074 A1 | 7/2008 | Wurz |
| 2008/0185432 A1 | 8/2008 | Caballero et al. |
| 2008/0212168 A1 | 9/2008 | Olmstead et al. |
| 2009/0134221 A1 | 5/2009 | Zhu et al. |
| 2009/0268023 A1* | 10/2009 | Hsieh ............ 348/143 |
| 2009/0313948 A1 | 12/2009 | Buckley et al. |
| 2009/0323084 A1 | 12/2009 | Dunn et al. |
| 2010/0035637 A1* | 2/2010 | Varanasi et al. ............ 455/457 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0202702 A1 | 8/2010 | Benos et al. |
| 2010/0208039 A1 | 8/2010 | Stettner |
| 2010/0220894 A1 | 9/2010 | Ackley et al. |
| 2011/0169999 A1 | 7/2011 | Grunow et al. |
| 2011/0202554 A1 | 8/2011 | Powilleit et al. |
| 2011/0249864 A1* | 10/2011 | Venkatesan et al. ............ 382/103 |
| 2011/0279916 A1 | 11/2011 | Brown et al. |
| 2011/0286007 A1 | 11/2011 | Pangrazio et al. |
| 2012/0056982 A1* | 3/2012 | Katz et al. ............ 348/43 |
| 2012/0081714 A1 | 4/2012 | Pangrazio et al. |
| 2012/0111946 A1 | 5/2012 | Golant |
| 2012/0138685 A1 | 6/2012 | Qu et al. |
| 2012/0168511 A1 | 7/2012 | Kotlarsky et al. |
| 2012/0168512 A1 | 7/2012 | Kotlarsky et al. |
| 2012/0185094 A1* | 7/2012 | Rosenstein et al. ............ 700/259 |
| 2012/0193407 A1 | 8/2012 | Barten |
| 2012/0193423 A1 | 8/2012 | Samek |
| 2012/0197464 A1* | 8/2012 | Wang et al. ............ 701/2 |
| 2012/0203647 A1 | 8/2012 | Smith |
| 2012/0218436 A1 | 8/2012 | Rodriguez et al. |
| 2012/0223141 A1 | 9/2012 | Good et al. |
| 2012/0228382 A1 | 9/2012 | Havens et al. |
| 2012/0242852 A1 | 9/2012 | Hayward et al. |
| 2012/0248188 A1 | 10/2012 | Kearney |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0294549 A1 | 11/2012 | Doepke |
| 2012/0299961 A1 | 11/2012 | Ramkumar et al. |
| 2012/0300991 A1 | 11/2012 | Mikio |
| 2013/0043312 A1 | 2/2013 | Van Horn |
| 2013/0050426 A1* | 2/2013 | Sarmast et al. ............ 348/46 |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0101158 A1 | 4/2013 | Lloyd et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0214048 A1 | 8/2013 | Wilz |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedrao |
| 2013/0306734 A1 | 11/2013 | Xian et al. |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0021256 A1 | 1/2014 | Qu et al. |
| 2014/0025584 A1 | 1/2014 | Liu et al. |
| 2014/0027518 A1 | 1/2014 | Edmonds et al. |
| 2014/0034723 A1 | 2/2014 | Van Horn et al. |
| 2014/0034731 A1 | 2/2014 | Gao et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0061307 A1 | 3/2014 | Wang et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0086348 A1 | 3/2014 | Peake et al. |
| 2014/0097249 A1 | 4/2014 | Gomez et al. |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |

(56) References Cited

U.S. PATENT DOCUMENTS

| | | | |
|---|---|---|---|
| 2014/0129378 A1 | 5/2014 | Richardson |
| 2014/0131441 A1 | 5/2014 | Nahill et al. |
| 2014/0133379 A1 | 5/2014 | Wang et al. |
| 2014/0140585 A1 | 5/2014 | Wang |
| 2014/0151453 A1 | 6/2014 | Meier et al. |
| 2014/0160329 A1 | 6/2014 | Ren et al. |
| 2014/0267609 A1 | 9/2014 | Laffargue |

FOREIGN PATENT DOCUMENTS

| | | |
|---|---|---|
| EP | 2381421 A2 | 10/2011 |
| EP | 2722656 A1 | 4/2014 |
| EP | 2779027 A1 | 9/2014 |
| JP | 2008210276 A | 9/2008 |
| KR | 20110013200 A | 2/2011 |
| KR | 20110117020 A | 10/2011 |
| KR | 20120028109 A | 3/2012 |
| WO | 2006095110 A1 | 9/2006 |
| WO | 2007015059 A1 | 2/2007 |
| WO | 2013163789 A1 | 11/2013 |
| WO | 2013166368 A1 | 11/2013 |
| WO | 2013173985 A1 | 11/2013 |
| WO | 2014019130 A1 | 2/2014 |

OTHER PUBLICATIONS

U.S. Appl. No. 13/912,262, not yet published, filed Jun. 7, 2013, Hand Held Products Inc., Method of Error Correction for 3D Imaging Device: 33 pages.

U.S. Appl. No. 14/453,019, not yet published, filed Aug. 6, 2014, Hand Held Products Inc., Dimensioning System With Guided Alignment: 31 pages.

European Office Action for application EP 13186043, dated Jun. 12, 2014 (now EP2722656 (Apr. 23, 2014)), Total of 6 pages.

U.S. Appl. No. 14/461,524, not yet published, filed Aug. 18, 2014, Hand Held Products Inc., System and Method for Package Dimensioning: 21 pages.

U.S. Appl. No. 13/367,978, filed Feb. 7, 2012, (Feng et al.); now abandoned.

U.S. Appl. No. 13/736,139 for an Electronic Device Enclosure, filed Jan. 8, 2013 (Chaney); 40 pages.

U.S. Appl. No. 13/771,508 for an Optical Redirection Adapter, filed Feb. 20, 2013 (Anderson); 26 pages.

U.S. Appl. No. 13/780,356 for a Mobile Device Having Object Identification Interface, filed Feb. 28, 2013 (Samek et al.); 21 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

U.S. Appl. No. 13/927,398 for a Code Symbol Reading System Having Adaptive Autofocus, filed Jun. 26, 2013 (Todeschini); 24 pages.

U.S. Appl. No. 13/930,913 for a Mobile Device Having an Improved User Interface for Reading Code Symbols, filed Jun. 28, 2013 (Gelay et al.); 24 pages.

U.S. Appl. No. 13/933,415 for an Electronic Device Case, filed Jul. 2, 2013 (London et al.); 47 pages.

U.S. Appl. No. 13/947,296 for a System and Method for Selectively Reading Code Symbols, filed Jul. 22, 2013 (Rueblinger et al.); 29 pages.

U.S. Appl. No. 13/950,544 for a Code Symbol Reading System Having Adjustable Object Detection, filed Jul. 25, 2013 (Jiang); 28 pages.

U.S. Appl. No. 13/961,408 for a Method for Manufacturing Laser Scanners, filed Aug. 7, 2013 (Saber et al.); 26 pages.

U.S. Appl. No. 14/018,729 for a Method for Operating a Laser Scanner, filed Sep. 5, 2013 (Feng et al.); 24 pages.

U.S. Appl. No. 14/019,616 for a Device Having Light Source to Reduce Surface Pathogens, filed Sep. 6, 2013 (Todeschini); 23 pages.

U.S. Appl. No. 14/023,762 for a Handheld Indicia Reader Having Locking Endcap, filed Sep. 11, 2013 (Gannon); 31 pages.

U.S. Appl. No. 14/035,474 for Augmented-Reality Signature Capture, filed Sep. 24, 2013 (Todeschini); 33 pages.

U.S. Appl. No. 14/047,896 for Terminal Having Illumination and Exposure Control filed Oct. 7, 2013 (Jovanovski et al.); 32 pages.

U.S. Appl. No. 14/053,175 for Imaging Apparatus Having Imaging Assembly, filed Oct. 14, 2013 (Barber); 39 pages.

U.S. Appl. No. 14/055,234 for Dimensioning System, filed Oct. 16, 2013 (Fletcher); 26 pages.

U.S. Appl. No. 14/053,314 for Indicia Reader, filed Oct. 14, 2013 (Huck); 29 pages.

U.S. Appl. No. 14/065,768 for Hybrid System and Method for Reading Indicia, filed Oct. 29, 2013 (Meier et al.); 22 pages.

U.S. Appl. No. 14/074,746 for Self-Checkout Shopping System, filed Nov. 8, 2013 (Hejl et al.); 26 pages.

U.S. Appl. No. 14/074,787 for Method and System for Configuring Mobile Devices via NFC Technology, filed Nov. 8, 2013 (Smith et al.); 28 pages.

U.S. Appl. No. 14/087,190 for Optimal Range Indicators for Bar Code Validation, filed Nov. 22, 2013 (Hejl); 27 pages.

U.S. Appl. No. 14/345,735 for Optical Indicia Reading Terminal with Combined Illumination filed Mar. 19, 2014 (Ouyang); 19 pages.

U.S. Appl. No. 14/101,965 for High Dynamic-Range Indicia Reading System, filed Dec. 10, 2013 (Xian); 28 pages.

U.S. Appl. No. 14/118,400 for Indicia Decoding Device with Security Lock, filed Nov. 18, 2013 (Liu); 28 pages.

U.S. Appl. No. 14/150,393 for Incicia-reader Having Unitary Construction Scanner, filed Jan. 8, 2014 (Colavito et al.); 28 pages.

U.S. Appl. No. 14/154,207 for Laser Barcode Scanner, filed Jan. 14, 2014 (Hou et al.); 26 pages.

U.S. Appl. No. 14/154,915 for Laser Scanning Module Employing a Laser Scanning Assembly having Elastomeric Wheel Hinges, filed Jan. 14, 2014 (Havens et al.); 24 pages.

U.S. Appl. No. 14/158,126 for Methods and Apparatus to Change a Feature Set on Data Collection Devices, filed Jan. 17, 2014 (Berthiaume et al.); 53 pages.

U.S. Appl. No. 14/342,551 for Terminal Having Image Data Format Conversion filed Mar. 4, 2014 (Lui et al.); 25 pages.

U.S. Appl. No. 14/342,544 for Imaging Based Barcode Scanner Engine with Multiple Elements Supported on a Common Printed Circuit Board filed Mar. 4, 2014 (Liu et al.); 27 pages.

U.S. Appl. No. 14/257,174 for Reading Apparatus Having Partial Frame Operating Mode filed Apr. 21, 2014, (Barber et al.), 67 pages.

U.S. Appl. No. 14/200,405 for Indicia Reader for Size-Limited Applications filed Mar. 7, 2014 (Feng et al.); 42 pages.

U.S. Appl. No. 14/166,103 for Indicia Reading Terminal Including Optical Filter filed Jan. 28, 2014 (Lu et al.); 29 pages.

U. S. Appl. No. 14/274,858 for Mobile Printer With Optional Battery Accessory, filed May 12, 2014, (Marty et al.), 26 pages.

U.S. Appl. No. 14/264,173 for Autofocus Lens System for Indicia Readers filed Apr. 29, 2014, (Ackley et al.), 39 pages.

U.S. Appl. No. 14/230,322 for Focus Module and Components with Actuator filed Mar. 31, 2014 (Feng et al.); 92 pages.

U.S. Appl. No. 14/222,994 for Method and Apparatus for Reading Optical Indicia Using a Plurality of Data filed Mar. 24, 2014 (Smith et al.); 30 pages.

(56) References Cited

OTHER PUBLICATIONS

U.S. Appl. No. 14/231,898 for Hand-Mounted Indicia-Reading Device with Finger Motion Triggering filed Apr. 1, 2014 (Van Horn et al.); 36 pages.
U.S. Appl. No. 29/486,759 for an Imaging Terminal, filed Apr. 2, 2014 (Oberpriller et al.); 8 pages.
U.S. Appl. No. 29/436,337 for an Electronic Device, filed Nov. 5, 2012 (Fitch et al.); 19 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/459,681 for an Electronic Device Enclosure, filed Jul. 2, 2013 (Chaney et al.); 14 pages.
U.S. Appl. No. 29/459,785 for a Scanner and Charging Base, filed Jul. 3, 2013 (Fitch et al.); 21 pages.
U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 44 pages.
Peter Clarke, Actuator Developer Claims Anti-Shake Breakthrough for Smartphone Cams, Electronic Engineering Times, p. 24, May 16, 2011.
U.S. Appl. No. 14/055,234, not yet published, Hand Held Products, Inc. Filed Oct. 16, 2013; 26 pages.
European Search Report for application No. EP13186043 (now EP2722656 (Apr. 23, 20149)): Total pp. 7.
U.S. Appl. No. 14/490,989, not yet published, filed Sep. 19, 2014, Intermec IP Corporation, Volume Dimensioning System Calibration Systems and Methods:.
Wikipedia, YUV description and definition, downloaded from http://www.wikipeida.org/wiki/YUV on Jun. 29, 2012, 10 pages.
YUV Pixel Format, downloaded from http://www.fource.org/yuv.php on Jun. 29, 2012; 13 pages.
YUV to RGB Conversion, downloaded from http://www.fource.org/fccyvrgb.php on Jun. 29, 2012; 5 pages.
Benos et al., "Semi-Automatic Dimensioning with Imager of a Portable Device," U.S. Appl. No. 61/149,912; filed Feb. 4, 2009 (now expired), 56 pages.
Dimensional Weight—Wikipedia, the Free Encyclopedia, URL=http://en.wikipedia.org/wiki/Dimensional_weight, download date Aug. 1, 2008, 2 pages.
Dimensioning—Wikipedia, the Free Encyclopedia, URL=http://en.wikipedia.org/wiki/Dimensioning, download date Aug. 1, 2008, 1 page.
European Patent Office Action for Application No. 14157971.4-1906, Dated Jul. 16, 2014, 5 pages.
European Patent Search Report for Application No. 14157971.4-1906, Dated Jun. 30, 2014, 6 pages.
Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages.
Kazantsev, Aleksei et al. "Robust Pseudo-Random Coded Colored STructured Light Techniques for 3D Object Model Recovery"; ROSE 2008 IEEE International Workshop on Robotic and Sensors Environments (Oct. 17-18, 2008) , 6 pages.
Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages.
Proesmans, Marc et al. "Active Acquisition of 3D Shape for Moving Objects" 0-7803-3258-X/96 1996 IEEE; 4 pages.
Salvi, Joaquim et al. "Pattern Codification Strategies in Structured Light Systems" published in Pattern Recognition; The Journal of the Pattern Recognition Society, Received Mar 6, 2003; Accepted Oct. 2, 2003; 23 pages.
U.S. Appl. No. 14/519,179, Serge Thuries et al., filed Oct. 21, 2014, not published yet. 40 pages.
U.S. Appl. No. 14/519,249, H. Sprague Ackley et al., filed Oct. 21, 2014, not published yet. 36 pages.
U.S. Appl. No. 14/519,233, Franck Laffargue et al., filed Oct. 21, 2014, not published yet. 34 pages.
U.S. Appl. No. 14/519,211, H. Sprague Ackley et al., filed Oct. 21, 2014, not published yet. 33 pages.
U.S. Appl. No. 14/519,195, Franck Laffargue et al., filed Oct. 21, 2014, not published yet. 35 pages.

* cited by examiner

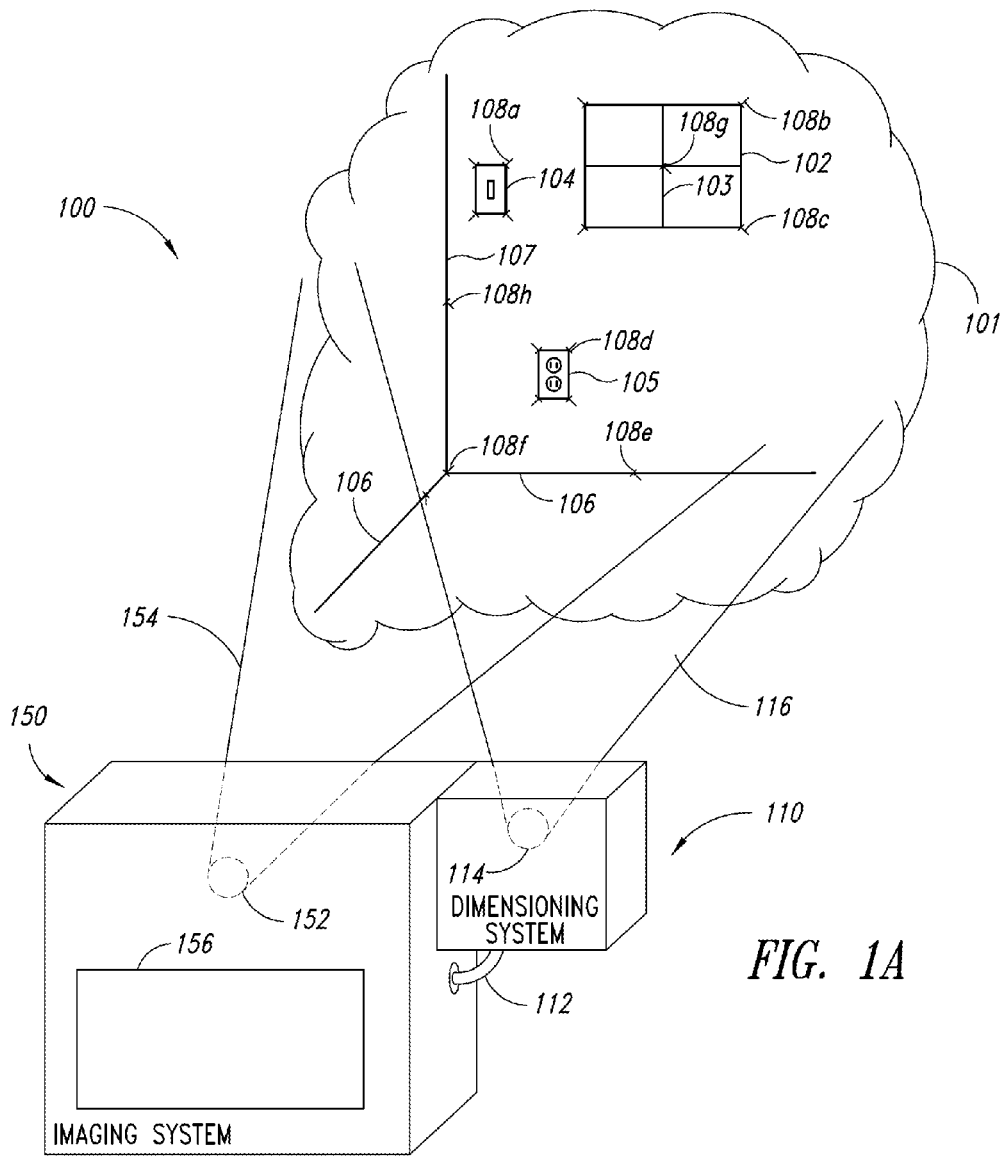
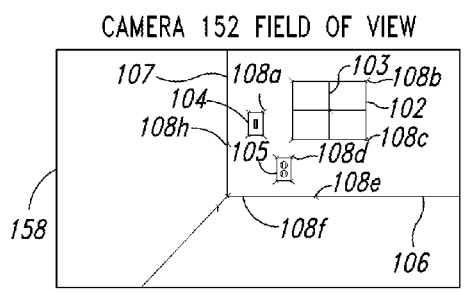
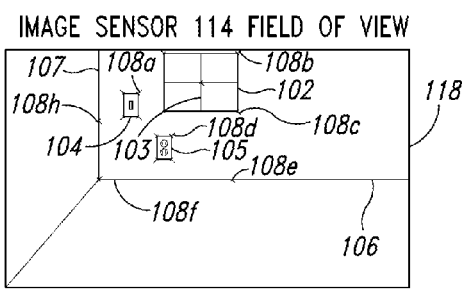
FIG. 1A
FIG. 1B
FIG. 1C

DIMENSIONING SYSTEM CALIBRATION SYSTEMS AND METHODS

CROSS-REFERENCE TO RELATED APPLICATIONS

The present application is related to U.S. patent application Ser. No. 13/464,799, entitled "Volume Dimensioning Systems and Methods" which was filed May 4, 2012, and which is incorporated by reference herein as if reproduced in its entirety to the extent that the subject matter and terminology of the incorporated reference do not conflict with the subject matter and terminology contained herein.

BACKGROUND

1. Field

This disclosure generally relates to non-contact systems and methods for determining dimensions and volume of one or more objects.

2. Description of the Related Art

Dimensioning systems are useful for providing dimensional and volumetric data related to three-dimensional objects disposed within a field of view of the dimensioning system. Such dimensional and volumetric information is useful for example, in providing consumers with accurate shipping rates based on the actual size and volume of the object being shipped. Additionally, the dimensioning system's ability to transmit parcel data immediately to a carrier can assist the carrier in selecting and scheduling appropriately sized vehicles based on measured cargo volume and dimensions. Finally, the ready availability of dimensional and volumetric information for all the objects within a carrier's network assists the carrier in ensuring optimal use of available space in the many different vehicles, containers and/or warehouses used in local, interstate, and international commerce.

A wide variety of computing devices are used within the shipping industry. For example, personal computers used as multi-tasking terminals in small storefront packing and shipping establishments. Also, for example, dedicated self-service shipping kiosks found in many post offices. As a further example, dedicated handheld scanners are frequently used as mobile terminals by many international shipping corporations. The wide variety of form factors found in the shipping industry are quite diverse, yet all rely upon providing accurate information, such as parcel dimensions and volume, to both the user in order to provide accurate shipping rates and to the carrier in order to accurately forecast shipping volumes.

BRIEF SUMMARY

The ability to connect and interface a dimensioning system with a variety of platforms such as one finds within the shipping industry presents many physical and logistical challenges. For example, the image sensor or camera used on many systems to provide a simple two-dimensional visual image must often be calibrated to a dimensioning system sensor that is responsible for providing data useful in dimensioning and determining the volume of three-dimensional objects.

A dimensioning system device selectively couplable to an imaging system device that has at least one imaging system image sensor and at least one imaging system display coupled to present display images acquired by the at least one imaging system image sensor may be summarized as including at least one dimensioning system sensor; at least one dimensioning system non-transitory processor-readable medium; and at least one dimensioning system processor communicatively coupled to the at least one dimensioning system non-transitory computer readable medium, where: in a calibration mode the dimensioning system device: captures a depth map; captures an intensity image; receives imaging system image data display image from the imaging system, the imaging system image data representative of an image captured via the at least one imaging sensor; and determines a number of extrinsic parameters that provide a correspondence between a three-dimensional point in each of the depth map and the intensity image as viewed by the dimensioning system sensor with a same three-dimensional point viewed by the at least one imaging system image sensor of the imaging system device; and in a run-time mode the dimensioning system device: generates a packaging wireframe image to be presented by the at least one imaging system display of the imaging system positioned to encompass an object in a display of the image represented by the imaging system image data concurrently presented with the package wireframe image by the at least one imaging system display as correlated spatially therewith based at least in part on the determined extrinsic parameters.

Responsive to the receipt of at least one input when in run-time mode, the dimensioning system device may further: capture a second depth map; capture a second intensity image; receive a second display image from the imaging system; and determine a number of extrinsic parameters that provide a correspondence between a three-dimensional point in each of the second depth map and the second intensity image as viewed by the dimensioning system sensor with a same three-dimensional point viewed by the at least one imaging system image sensor of the imaging system device.

The dimensioning system device may further include a timer configured to provide an output at one or more intervals; and wherein responsive to the at least one output by the timer, the dimensioning system device may further: capture a second depth map; capture a second intensity image; receive a second display image from the imaging system; and determine a number of extrinsic parameters that provide a correspondence between a three-dimensional point in each of the second depth map and the second intensity image as viewed by the dimensioning system sensor with a same three-dimensional point viewed by the at least one imaging system image sensor of the imaging system device.

The dimensioning system device may further include a depth lighting system to selectively illuminate an area within a field of view of the dimensioning system sensor, and wherein the dimensioning system device may selectively illuminate the area contemporaneous with the capture of the depth map and the capture of the intensity image by the dimensioning system sensor.

The depth lighting system may provide at least one of: a structured light pattern or a modulated light pattern.

The dimensioning system device may further include at least one of: an automatic exposure control system, and wherein the automatic exposure control system may adjust an exposure of at least one of the depth map and the intensity image contemporaneous with the selective illumination of the area within the field of view of the dimensioning system sensor; and an automatic gain control system, and wherein the automatic gain control system may adjust a gain of at least one of the depth map and the intensity image contemporaneous with the selective illumination of the area within the field of view of the dimensioning system sensor.

In response to at least one input when in calibration mode, the dimensioning system device may establish a correspondence between a three-dimensional point in each of the depth map and the intensity image as viewed by the dimensioning system sensor with a same three-dimensional point viewed by the at least one imaging system image sensor of the imaging system device. The at least one imaging system display may include a display device configured to provide input/output capabilities; and wherein the at least one input may be provided via the imaging system display.

A method of operation of a dimensioning system device may be summarized as including detecting via a dimensioning system sensor communicably coupled to a dimensioning system processor, a selective coupling of an imaging system device to the dimensioning system device, the imaging system including at least one imaging system image sensor and at least one imaging system display; capturing by the dimensioning system device a depth map via the dimensioning system sensor; capturing by the dimensioning system device an intensity image via the dimensioning system sensor; receiving by the dimensioning system device imaging system image data, the imaging system image data representing an image captured by the at least one imaging system image sensor; and determining by the dimensioning system device a number of extrinsic parameters that provide a correspondence between a point in the depth map and intensity image as viewed by the dimensioning system sensor with a same point as viewed by the at least one imaging system image sensor of the imaging system device.

The method of operation of a dimensioning system device may further include generating by the dimensioning system processor a packaging wireframe model for presentation by the at least one imaging system display of the imaging system, the packaging wireframe model positioned to encompass an object in the imaging system image data concurrently presented by the at least one imaging system display and spatially correlated therewith based at least in part on the determined extrinsic parameters.

Determining by the dimensioning system processor a number of extrinsic parameters that provide a correspondence between a point in the depth map and intensity image as viewed by the dimensioning system sensor with a same point as viewed by the at least one imaging system image sensor of the imaging system device may include determining by the dimensioning system device a number of points positioned on at least one feature in the depth map and the intensity image; and determining by the dimensioning system device an equal number of respective points similarly positioned on the at least one feature in the imaging system image data. Determining by the dimensioning system device a number of points positioned on at least one feature in the depth map and the intensity image may include determining by the dimensioning system device a minimum of at least eight points positioned on at least one feature in the depth map and the intensity image, the at least one feature including an item other than a calibration target. The imaging system image sensor may include a known back focus value ($f_c$); and wherein determining by the dimensioning system processor a number of extrinsic parameters that provide a correspondence between a point in the depth map and intensity image as viewed by the dimensioning system sensor with a same point as viewed by the at least one imaging system image sensor of the imaging system device may include for each of the minimum of at least eight points: determining by the dimensioning system device a point coordinate location ($x_i$, $y_i$) within the intensity image; determining by the dimensioning system device a point depth ($z_i$) within the depth map for the determined point coordinate location ($x_i$, $y_i$); and determining by the dimensioning system device a respective point coordinate location ($x_c$, $y_c$) within the imaging system image data. Determining by the dimensioning system processor a number of extrinsic parameters that provide a correspondence between a point in the depth map and intensity image as viewed by the dimensioning system sensor with a same point as viewed by the at least one imaging system image sensor of the imaging system device may further include determining via the dimensioning system device all of the components of a three-by-three, nine component, Rotation Matrix ($R_{11-33}$) and a three element Translation Vector ($T_{0-2}$) that relate the depth map and intensity image to the imaging system image data using the following equations:

$$x_c = f_c \frac{R_{11}x_i + R_{12}y_i + R_{13}z_i + T_0}{R_{31}x_i + R_{32}y_i + R_{33}z_i + T_2}$$

$$x_c = f_c \frac{R_{21}x_i + R_{22}y_i + R_{23}z_i + T_1}{R_{31}x_i + R_{32}y_i + R_{33}z_i + T_2}.$$

Capturing by the dimensioning system device a depth map via the dimensioning system sensor may include selectively illuminating an area within a first field of view of the dimensioning system sensor with at least one of a structured light pattern or a modulated light pattern. Capturing by the dimensioning system device at least one of the depth map or the intensity image may further include at least one of: autonomously adjusting an exposure of the dimensioning system device contemporaneous with the selective illumination of the area within the first field of view of the dimensioning system sensor with at least one of a structured light pattern or a modulated light pattern; and autonomously adjusting a gain of the dimensioning system device contemporaneous with the selective illumination of the area within the first field of view of the dimensioning system sensor with at least one of a structured light pattern or a modulated light pattern. Determining by the dimensioning system processor a number of extrinsic parameters that provide a correspondence between a point in the depth map and intensity image as viewed by the dimensioning system sensor with a same point as viewed by the at least one imaging system image sensor of the imaging system device may include receiving by the dimensioning system device, an input identifying a point located on at least on feature in the depth map and the intensity image; and receiving by the dimensioning system device, a second input identifying a point similarly located on the at least one feature in the imaging system image data.

A method of calibrating a dimensioning system device upon communicably coupling the dimensioning system device to an imaging system including an imaging system display and an imaging system image sensor may be summarized as including receiving by the dimensioning system device a depth map and an intensity image of a scene provided by a dimensioning system sensor in the dimensioning system device, the depth map and the intensity image including a common plurality of three-dimensional points; receiving by the dimensioning system device an imaging system image data from the imaging system image sensor, the imaging system image data comprising a plurality of visible points, at least a portion of the plurality of visible points corresponding to at least a portion of the plurality of three-dimensional points; determining via the dimensioning system device a number of points positioned on at least on feature appearing in the depth map and intensity image with a same number of points similarly positioned on the at least one feature appearing in the imaging system image data, the at least one feature not including a calibration target; determining by the dimensioning system device a number of extrinsic parameters spatially relating each of the number of points in the depth map and the intensity image with each of the respective, same number of points in the imaging system image data.

The method of calibrating a dimensioning system device upon communicably coupling the dimensioning system device to an imaging system including an imaging system display and an imaging system image sensor may further include identifying, by the dimensioning system device, at least one three-dimensional object in the depth map and the intensity image; generating by the dimensioning system device and based at least in part on the determined number of extrinsic parameters, a packaging wireframe for presentation on the imaging system display, the packaging wireframe substantially encompassing the at least one three-dimensional object; and generating by the dimensioning system device, a composite image signal including the three-dimensional wireframe substantially encompassing an image of the three-dimensional object appearing in the imaging system image data; and displaying the composite image signal on the imaging system display.

The imaging system image sensor may include a back focus value ($f_c$); and wherein determining a number of extrinsic parameters spatially relating each of the number of points in the depth map and the intensity image with each of the respective, same number of points in the imaging system image data may include determining by the dimensioning system device at least eight points located on at least one feature in the depth map and the intensity image; and determining by the dimensioning system device an equal number of respective points similarly located on the at least one feature in the imaging system image data; determining by the dimensioning system device for each of the at least eight points a point coordinate location ($x_i$, $y_i$) within the intensity image; determining by the dimensioning system device for each of the at least eight points a point depth ($z_i$) within the depth map for the determined point coordinate location ($x_i$, $y_i$); and determining by the dimensioning system device a respective point coordinate location for each of the at least eight points ($x_c$, $x_c$) within the imaging system image data. Determining a number of extrinsic parameters spatially relating each of the number of points in the depth map and the intensity image with each of the respective, same number of points in the imaging system image data may include determining via the dimensioning system device all of the components of a three-by-three, nine component, Rotation Matrix ($R_{11-33}$) and a three element Translation Vector ($T_{0-2}$) that relate the depth map and intensity image to the imaging system image data using the following equations:

$$x_c = f_c \frac{R_{11}x_i + R_{12}y_i + R_{13}z_i + T_0}{R_{31}x_i + R_{32}y_i + R_{33}z_i + T_2}$$

$$x_c = f_c \frac{R_{21}x_i + R_{22}y_i + R_{23}z_i + T_1}{R_{31}x_i + R_{32}y_i + R_{33}z_i + T_2}.$$

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 1A is a schematic diagram of an example dimensioning system physically and communicably coupled to an example imaging system, with a scene useful for calibration appearing in both the field of view of the imaging system image sensor and the field of view of the dimensioning system sensor.

FIG. 1B is a screen image of a view of the scene useful for calibration as it appears in the field of view of the imaging system image sensor as shown in FIG. 1A.

FIG. 1C is a screen image of a view of the scene useful for calibration as it appears in the field of view of the dimensioning system sensor, after the dimensioning system has been physically and communicably coupled to the imaging system, as shown in FIG. 1A.

DETAILED DESCRIPTION

Figure 2:
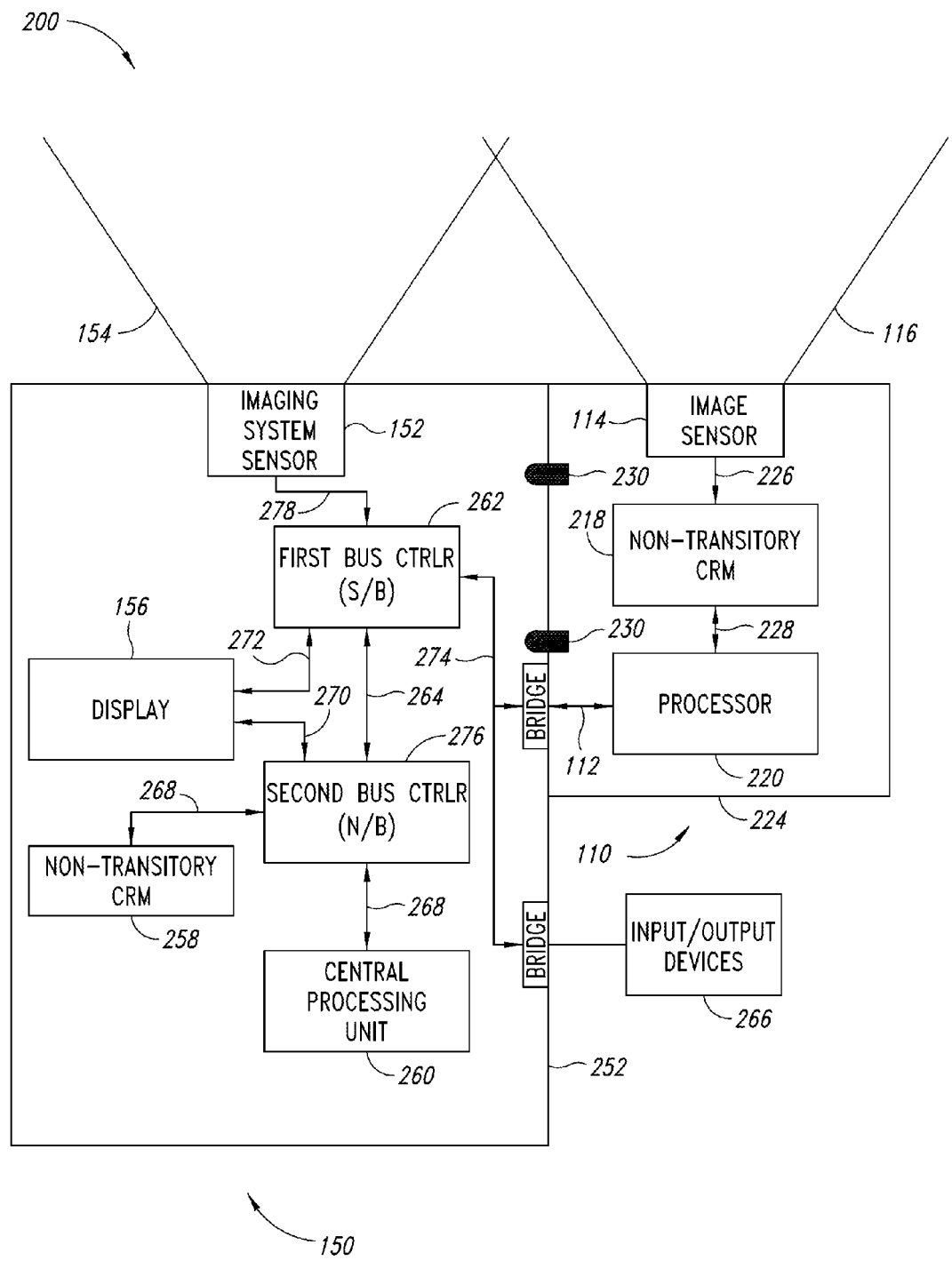
FIG. 2 is a schematic diagram of an example dimensioning system that has been physically and communicably coupled to an example imaging system as shown in FIG. 1A.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with sources of electromagnetic energy, operative details concerning image sensors and cameras and detailed architecture and operation of the imaging system have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

A dimensioning system can generate and display a packaging wireframe model or a shape overlay on a representation (visual, digital) of three-dimensional object within the field of view of the dimensioning system. Generally, the dimensioning system can include one or more sensors that are individually or jointly capable of acquiring at least three-dimensional depth data corresponding to a depth map of the scene captured by the one or more sensors. In some instances, the dimensioning system may include one or more sensors that are individually or jointly capable of acquiring intensity data corresponding to an intensity image of the scene captured by the one or more sensors. In some instances, the same one or more dimensioning system sensors may acquire both the depth data and the intensity data of the scene captured by the one or more sensors.

However, neither the depth map nor the intensity image may be useful for providing information to the system user. For example, if the dimensioning system has inadvertently omitted one or more three-dimensional objects in the field of view of the dimensioning system sensor, providing an easy, intuitive, way for a user to indicate to the dimensioning system the existence of the three-dimensional object in the field of view of the imaging system image sensor may be advantageous. One potential way to provide an intuitive, easy to use, interface is to provide via an imaging system image sensor a visible image on one or more display devices corresponding to at least a portion of the field of view of the dimensioning system sensor. The dimensioning system could then indicate, for example through the use of an overlay, superimposed wireframe, or bounding element, one or more three-dimensional objects lying within the field of view of the dimensioning system sensor and the imaging system image sensor for which dimensional and volumetric information has been generated by the dimensioning system.

However, the overlay, superimposed wireframe, or bounding element must be displayed in a spatially accurate manner that substantially follows, conforms, or maps to the actual boundaries of the three-dimensional object. To achieve an acceptable degree of accuracy in of spatial mapping, the imaging system image sensor and the dimensioning system sensor should be calibrated or mapped such that the overlay, superimposed wireframe, or bounding element generated by the dimensioning system substantially follows, conforms, or maps to the physical boundaries of the three-dimensional object when the visible image provided by the imaging system image sensor is viewed on the one or more display devices.

Calibrations or mappings between one or more dimensioning system sensors and at least one imaging system image sensor are particularly difficult when the dimensioning system housing the dimensioning system sensor is configured for selective attachment to a wide variety of imaging systems having vastly differing form factors. For example, in some applications the dimensioning system may be physically and communicably coupled to a self service kiosk, while in other applications the same dimensioning system may be physically and communicably coupled to a handheld device such as a handheld scanner, cell phone, or personal digital assistant ("PDA"). In addition to the large variety of devices, the environmental conditions in which the imaging system is used may range from the relatively clean and protected conditions typical of a post office foyer to the relatively exposed and rough-and-tumble environments typical of a warehouse floor or cargo bay.

Spatially mapping the two-dimensional data provided by the imaging system to the three-dimensional data provided by the dimensioning system quickly and reliably while in a pre-run time environment that exists upon communicably coupling the dimensioning system to the imaging system improves the accuracy and acceptance of the dimensioning system by users. It is advantageous to automatically calibrate the dimensioning system sensor with the imaging system image sensor without requiring the use of a specific calibration target. The spatially mapped imaging system and dimensioning system may then enter a run time mode where the dimensioning system is able to provide dimensional and volumetric information on three-dimensional objects placed within the field of view of the dimensioning system. The dimensional and volumetric information may be presented to the user on a display device is coupled to the imaging system in the form of a packaging wireframe model that is spatially mapped to, and concurrently displayed with, the visible image of the three-dimensional object.

Providing the ability to periodically recalibrate the dimensioning system when in run time mode provides a robust, reliable system capable of accurately providing volumetric and dimensional information without requiring time consuming and costly recalibration by trained personnel using calibration targets.

FIG. 1A shows a system 100 including an example dimensioning system 110 that has been physically and communicably coupled to an imaging system 150. The dimensioning system 110 includes one or more dimensioning system sensors 114 (one shown), each having a respective field of view 116. The imaging system 150 includes at least one imaging system image sensor 152 (one shown), each having a respective field of view 154 and at least one imaging system display 156. The dimensioning system 110 is physically coupled to the imaging system 150 using one or more physical couplers such as hooks and slots, pins, clamps, magnetic fasteners, hook and loop fasteners, threaded fasteners, or similar not visibly apparent in FIG. 1A. The dimensioning system 110 is communicably coupled to the imaging system 150 via one or more bi-directional data busses 112 (one shown).

A scene 101 lays within the field of view 116 of the dimensioning system sensor(s) 114 and the field of view 154 of the imaging system image sensor(s) 152. The scene 101 may include any environment, for example a warehouse, a lobby, a service counter, or even an empty room. In FIG. 1A, an example scene 101 includes the corner of an empty room containing a four pane window 102 with frame 103, a switch 104, an outlet 105, a floor joint line 106 formed by the intersection of a floor with a wall, and a wall joint line 107 formed by the intersection of two walls. In at least some embodiments, the scene 101 of the empty room is used to calibrate the dimensioning system sensor(s) 114 with the imaging system image sensor(s) 152 upon communicably coupling the dimensioning system 110 to the imaging system 150.

FIG. 1B shows the empty room scene 101 as viewed from the point of view of the imaging system image sensor(s) 152. FIG. 1C shows the empty room scene 101 as viewed from the point of view of the dimensioning system sensor(s) 114. Comparing the point of view of the scene 101 received from the imaging system image sensor(s) 152 (FIG. 1B) with the point of view of the scene 101 received from the dimensioning system sensor(s) 114, the differing points of view of the scene 101 caused by the non-collinear relationship between the dimensioning system sensor(s) 114 and the imaging system image sensor(s) 152 become apparent.

However, despite the differing points of view, sufficient overlap exists between the fields of view of the dimensioning system sensor(s) 114 and the imaging system image sensor(s) 152 such that both the dimensioning system sensor(s) 114 and the imaging system image sensor(s) 152 share a plurality of identifiable three-dimensional points or features existent within the images of the scene 101. Example three-dimensional points or features visible in both the field of view of the dimensioning system sensor(s) 114 and the imaging system image sensor(s) 152 include: a corner of the switch 108*a*, a first corner of the window 108*b*, a second corner of the window 108*c*, a corner of the outlet 108*d*, the floor/wall joint 108*e*, the intersection of the floor/wall joint and the wall/wall joint 108*f*, the intersection of the window frame 108*g*, and the wall/wall joint 108*h* (collectively "three-dimensional points 108"). Additional three-dimensional points 108 may exist in the image of the scene 101, however for brevity such points are omitted from the discussion below.

A pre-run time calibration routine is executed by the dimensioning system 110, the imaging system 150, or both the dimensioning system 110 and the imaging system 150 upon detection of the coupling of the dimensioning system 110 to the imaging system 150. The pre-run time calibration routine provides an accurate mapping of the scene 101 as viewed by the dimensioning system sensor(s) 114 to the scene 101 as viewed by the imaging system image sensor(s) 152. In at least some embodiments, the mapping is performed on a point-by-point or pixel-by-pixel basis between the depth and intensity data collected and provided by the dimensioning system 110 and the visible image data collected and provided by the imaging system 150. Upon completion of the pre-run time calibration routine, the dimensioning system 110 is placed into a run time mode in which the dimensioning system 110 can provide volumetric and dimensional information for three-dimensional objects placed in the field of view of the dimensioning system image sensor(s) 114. In at least some instances, the calibration routine may be manually or automatically re-executed by the dimensioning system 110 while in the run time mode.

In at least some situations, the dimensioning system sensor(s) 114 can collect, capture or sense depth and intensity data gathered from the scene 101 appearing in the field of view 116 of the dimensioning system sensor(s) 114. In some instances, the depth and intensity data, either alone or collectively, enable the dimensioning system 110 to identify at least a portion of the three-dimensional points 108 appearing in the scene 101. In some situations, the depth and intensity data may be transmitted from the dimensioning system 110 to the imaging system 150 via the bi-directional data bus(ses) 112 to permit the imaging system 150 to identify at least a portion of the same three-dimensional points 108 appearing in the visible image data collected by the imaging system image sensor(s) 152.

The imaging system image sensor(s) 152 can collect, capture or sense image data corresponding to the scene 101 within the field of view 154. In some instances, the image data may be transmitted from the imaging system 150 to the dimensioning system 110 via the bi-directional data bus(ses) 112 to allow the dimensioning system 110 to identify the same three-dimensional points 108 appearing in the scene 101 as viewed through the field of view 154 of the imaging system image sensor(s) 152. In some instances, the image data may be retained within the imaging system 150 to allow the imaging system 150 to identify the same three-dimensional points 108 appearing in the scene 101 as viewed through the field of view 154 of the imaging system image sensor(s) 152. In other instances, the image data may be transmitted to both the dimensioning system 110 and the imaging system 150 to allow both the dimensioning system 110 and the imaging system 150 to identify the same three-dimensional points 108 appearing in the scene 101 as viewed through the field of view 154 of the imaging system image sensor(s) 152.

The dimensioning system 110, the imaging system 150 or both correlate, associate or otherwise map the three-dimensional points 108 identified in the depth and intensity data provided by the dimensioning system 110 to the same three-dimensional points 108 in the image data provided by the imaging system 150. A number of extrinsic parameters may be determined based on the correlation, association, or mapping between the depth and intensity data provided by the dimensioning system 110 and the image data provided by the imaging system 150. These extrinsic parameters may be useful in providing an algorithmic relationship that spatially maps a three-dimensional point appearing in the depth map and the intensity image provided by the dimensioning system 110 to the same three-dimensional point appearing in the visible image provided by the imaging system 150.

In at least some instances, all or a portion of the number of extrinsic parameters may be used when system 100 is in a run time mode to quickly, accurately, and reliably superimpose a fitted packaging wireframe model generated by the dimensioning system 110 on an image of the three-dimensional object provided by the imaging system 150. The spatial mapping characterized by the number of extrinsic parameters determined during the pre-run time calibration routine permits an accurate fitting of the packaging wireframe model provided by the dimensioning system 110 to the image of the three-dimensional object provided by the imaging system 150. In at least some situations, the packaging wireframe model provided by the dimensioning system 110 may be concurrently displayed on the at least one imaging system display 156 with the visible image of the three-dimensional object provided by the imaging system 150 such that the packaging wireframe model provides an outline or framework about the image of the respective three-dimensional object to which the packaging wireframe model is fitted.

FIG. 2 shows the dimensioning system 110 physically and communicably coupled to the imaging system 150 in more detail. Although the imaging system 150 is represented as a kiosk based imaging system in FIG. 2, those of skill in the art will realize that other handheld, portable, or desktop computing or imaging devices may be similarly substituted. The dimensioning system 110 can include the dimensioning system sensor(s) 114 communicably coupled to one or more non-transitory, machine-readable storage media 218. One or more processors 220 are also communicably coupled to the one or more non-transitory, machine-readable storage media 218. The one or more processors 220 may include at least one data communications or networking interface used to exchange data between the dimensioning system 110 and the imaging system 150 via the one or more bi-directional data busses 112.

The bi-directional data bus(ses) 112 can include any serial or parallel bus capable of bi-directionally transmitting at least one digital signal. In one preferred embodiment, the bi-directional data bus 112 can be a universal serial bus ("USB") cable. In some embodiments, the bi-directional data bus(ses) 112 can include one or more wireless radio frequency signals, for example one or more signals conforming to the latest versions of at least one of: the IEEE 802.11a/b/g/n ("WiFi") signal protocol, the Bluetooth® signal protocol, or the near-field communication ("NFC") signal protocol. The dimensioning system 110 can be at least partially enclosed within a housing 224. In a preferred embodiment, the housing 224 may detachably coupled to the imaging system 150 using one or more physical couplers 230 such as one or more clips, clamps, or fasteners. The physical couplers 230 may in some instances include one or more "one-way" fittings that freely permit the physical attachment or coupling but resist the detachment of the dimensioning system 110 to the imaging system 150. The use of such "one-way" fittings may be advantageous, for example, in applications where all or a portion of the dimensioning system 110 or imaging system 150 is exposed to the public.

The imaging system 150 can include the imaging system image sensor(s) 152 which is/are communicably coupled to a first bus controller (e.g., a South Bridge processor) 262 via one or more serial or parallel data buses 278, for example a universal serial bus ("USB"), a small computer serial interface ("SCSI") bus, a peripheral component interconnect ("PCI") bus, an integrated drive electronics ("IDE") bus or similar. One or more local busses 264 communicably couple the first bus controller 262 to a second bus controller (e.g., a North Bridge processor) 276. The one or more non-transitory, machine-readable storage media 258 and central processing units ("CPUs") 260 are communicably coupled to the second bus controller 276 via one or more high-speed or high bandwidth busses 268. The one or more display devices 156 are communicably coupled to the second bus controller 276 via an analog or digital interface 270 such as a Video Graphics Array ("VGA") interface, a Digital Visual Interface ("DVI"), a High Definition Multimedia Interface ("HDMI"), or similar. In some instances, for example where the one or more display devices 156 include at least one touch-screen display device capable of receiving user input to the imaging system 150, some or all of the one or more display devices 156 may also be communicably coupled to the first bus controller 262, for example via one or more USB interfaces 272.

The dimensioning system 110 is communicably coupled to the imaging system 150 via one or more communication or data interfaces, for example one or more USB bridges coupled to a local or system bus 274 in the imaging system 150. The local or system bus 274 may also be shared with other peripheral devices, such as one or more I/O devices 266, which can include, but not be limited to, one or more keyboards, pointers, touchpads, trackballs, or the like. The imaging system 150 can be of any size, structure, or form factor, including, but not limited to a rack mounted kiosk system, a desktop computer, a laptop computer, a netbook computer, a handheld computer, a tablet computer, a cellular telephone, a personal digital assistant, or the like. Although for clarity and brevity one specific imaging system 150 architecture is presented in detail herein, those of ordinary skill in the art will appreciate that any imaging system 150 architecture may be similarly substituted.

Referring now in detail to the dimensioning system 110, the dimensioning system sensor(s) 114 include any number of devices, systems, or apparatuses suitable for collecting, capturing, or otherwise sensing three-dimensional image data from the scene 101 within the field of view 116 of the dimensioning system sensor(s) 114. Although referred to herein as "three-dimensional image data" it should be understood by one of ordinary skill in the art that the term may apply to more than one three-dimensional image and therefore would equally apply to "three-dimensional video images" which may be considered to comprise a series or time-lapse sequence including a plurality of "three-dimensional images." The three-dimensional image data acquired or captured by the dimensioning system sensor(s) 114 can include data collected using electromagnetic radiation either falling within the visible spectrum (e.g., wavelengths in the range of about 360 nm to about 750 nm) or falling outside of the visible spectrum (e.g., wavelengths below about 360 nm or above about 750 nm). For example, three-dimensional image data may be collected using infrared, near-infrared, ultraviolet, or near-ultraviolet light. The three-dimensional image data collected by the dimensioning system sensor(s) 114 may include data generated using laser or ultrasonic based imaging technology. In some embodiments, a visible, ultraviolet, or infrared supplemental lighting system (not shown in FIG. 2) may be synchronized to and used in conjunction with the system 100. For example, a supplemental lighting system providing one or more structured light patterns or a supplemental lighting system providing one or more modulated light patterns may be used to assist in collecting or deriving three-dimensional image data from the scene 101 within the field of view 116 of the dimensioning system sensor(s) 114.

In some implementations, the dimensioning system 110 may include a single image sensor 114 capable of acquiring both depth data useful in providing a three-dimensional depth map and intensity data useful in providing an intensity image of the scene 101. The acquisition of depth and intensity data using a single image sensor 114 advantageously eliminates parallax and provides a direct mapping between the depth data in the depth map and the intensity data in the intensity image. The depth map and intensity image may be collected in an alternating sequence by the dimensioning system sensor(s) 114 and the resultant depth data and intensity data stored within the one or more non-transitory, machine-readable storage media 218.

The three-dimensional image data collected, captured or sensed by the dimensioning system sensor(s) 114 may be in the form of an analog signal that is converted to digital data using one or more analog-to-digital ("ND") converters (not shown in FIG. 2) prior to storage in the non-transitory, machine-readable, storage media 218. The three-dimensional image data collected, captured or sensed by the dimensioning system sensor(s) 114 may be in the form of one or more digital data sets, structures, or files comprising digital image data supplied directly by the dimensioning system sensor(s) 114.

The dimensioning system sensor(s) 114 can take a large variety of forms (e.g., digital, analog, still image, molding images) and can be formed from or contain any number of image capture or collection elements, for example picture elements or "pixels." For example, the dimensioning system sensor(s) 114 can have between 1,000,000 pixels (1 MP) and 100,000,000 pixels (100 MP). The dimensioning system sensor(s) 114 can include any number of current or future developed image sensing devices, collectors, or systems that include, but are not limited to, one or more complementary metal-oxide semiconductor ("CMOS") image sensors or one or more charge-coupled device ("CCD") image sensors.

The three-dimensional image data can include more than one type of data associated with or collected, captured or otherwise sensed by each image capture element. For example, in some embodiments, the dimensioning system sensor(s) 114 may capture depth data in the form of a depth map of the three-dimensional objects in the field of view 116 of the dimensioning system sensor(s) 114. The dimensioning system sensor(s) 114 may also capture intensity data in the form of an intensity image of the three-dimensional objects in the field of view 116 of the dimensioning system sensor(s)

114. Where the dimensioning system sensor(s) 114 collect, capture, or otherwise sense more than one type of data, the data in the form of data groups, structures, files or the like may be captured either simultaneously or in an alternating sequence.

The dimensioning system sensor(s) 114 may also provide visible image data capable of rendering a visible black and white, grayscale, or color image of the scene 101. Such visible image data may be communicated to the imaging system 150 via the one or more bi-directional data busses 112 for display on the one or more display devices 156. In some instances, where the dimensioning system sensor(s) 114 is/are able to provide visible image data, the at least one imaging system image sensor 152 may be considered optional and may be omitted.

Data is communicated from the dimensioning system sensor(s) 114 to the non-transitory machine readable storage media 218 via serial or parallel data bus(ses) 226. The non-transitory, machine-readable storage media 218 can be any form of data storage device including, but not limited to, optical data storage, electrostatic data storage, electroresistive data storage, magnetic data storage, and/or molecular data storage devices. All or a portion of the non-transitory, machine-readable storage media 218 may be disposed within the one or more processors 220, for example in the form of a cache, registers, or similar non-transitory memory structure capable of storing data or machine-readable instructions executable by the processor(s) 220.

The non-transitory, machine-readable storage media 218 can have any data storage capacity from about 1 megabyte (1 MB) to about 3 terabytes (3 TB). Two or more storage devices may be used to provide all or a portion of the non-transitory, machine-readable storage media 218. For example, in some embodiments, the non-transitory, machine-readable storage media 218 can include a non-removable portion including a non-transitory, electrostatic, volatile storage medium and a removable portion such as a Secure Digital (SD) card, a compact flash (CF) card, a Memory Stick, or a universal serial bus ("USB") storage device.

The processor(s) 220 can execute one or more instruction sets that are stored in whole or in part in the non-transitory, machine-readable storage media 218. The machine executable instruction set(s) can include instructions related to basic functional aspects of the one or more processors 220, for example data transmission and storage protocols, communication protocols, input/output ("I/O") protocols, USB protocols, and the like. Machine executable instruction sets related to all or a portion of the calibration and dimensioning functionality of the dimensioning system 110 and intended for execution by the processor(s) 220 while in calibration or pre-run time mode, in run time mode, or combinations thereof may also be stored within the one or more non-transitory, machine-readable storage media 218, of the processor(s) 220, or within both the non-transitory, machine-readable storage media 218 and the processor(s) 220. Additional dimensioning system 110 functionality may also be stored in the form of machine executable instruction set(s) in the non-transitory, machine-readable storage media 218. Such functionality may include system security settings, system configuration settings, language preferences, dimension and volume preferences, and the like.

The non-transitory, machine-readable storage media 218 may also store machine executable instruction set(s) including one or more auto-executable or batch files intended for execution upon detection of the communicable coupling of the dimensioning system 110 to the imaging system 150. The auto-executable or batch file(s) can initiate the acquisition of depth and intensity data via the dimensioning system sensor(s) 114, the acquisition of image data via the imaging system image sensor(s) 152, and the determination of the number of extrinsic parameters that provide the spatial correspondence between a three-dimensional point 108 as viewed by the dimensioning system sensor(s) 114 with the same three-dimensional point 108 as viewed by the imaging system image sensor(s) 152. In at least some instances, additional machine executable instruction set(s) may be stored in the non-transitory, machine-readable storage media 218 to periodically repeat the acquisition of depth and intensity data via the dimensioning system sensor(s) 114, the acquisition of image data via the imaging system image sensor(s) 152, and the determination of the number of extrinsic parameters either automatically, for example on a regular or scheduled basis, or manually at the direction of a user or a system administrator.

Data is transferred between the non-transitory, machine-readable storage media 218 and the processor(s) 220 via serial or parallel bi-directional data bus(ses) 228. The processor(s) 220 can include any device comprising one or more cores or independent central processing units that are capable of executing one or more machine executable instruction sets. The processor(s) 220 can, in some embodiments, include a general purpose processor such as a central processing unit ("CPU") including, but not limited to, an Intel® Atom® processor, an Intel® Pentium®, Celeron®, or Core 2® processor, and the like. In other embodiments the processor(s) 220 can include a system-on-chip ("SoC") architecture, including, but not limited to, the Intel® Atom® System on Chip ("Atom SoC") and the like. In other embodiments, the processor(s) 220 can include a dedicated processor such as an application specific integrated circuit ("ASIC"), a programmable gate array ("PGA" or "FPGA"), a digital signal processor ("DSP"), or a reduced instruction set computer ("RISC") based processor. Where the dimensioning system 110 or the imaging system 150 is a battery-powered portable system, the processor(s) 220 can include low power consumption processor(s), for example Intel® Pentium M®, or Celeron M® mobile system processors or the like, to extend the system battery life. In at least some instances, power for the dimensioning system 110 may be supplied by the imaging system 150 via bi-directional data bus(ses) 112 or via a dedicated power supply.

Data in the form of three-dimensional image data, packaging wireframe model data, instructions, input/output requests and the like may be bi-directionally transferred between the dimensioning system 110 and the imaging system 150 via the bi-directional data bus(ses) 112. Within the imaging system 150, the packaging wireframe model data can, for example, be combined with visual image data collected, captured or otherwise sensed by the imaging system image sensor(s) 152 to provide a display output including a visual image of one or more three-dimensional objects 102 appearing in the imaging system image sensor(s) 152 field of view 154 concurrently with an image of the fitted packaging wireframe model provided by the dimensioning system 110.

In at least some embodiments, the dimensioning system 110 including the dimensioning system sensor(s) 114, the non-transitory, machine-readable storage media 218, and the processor(s) 220 are functionally combined to provide a run-time system capable rendering a packaging wireframe model that is scaled and fitted to the one or more three-dimensional objects appearing in the field of view 116.

Referring now in detail to the imaging system 150, the imaging system image sensor(s) 152 can collect, capture or otherwise sense visual image data of the scene 101 within the field of view 154 of the imaging system image sensor(s) 152.

As a device that is discrete from the dimensioning system sensor(s) 114, the imaging system image sensor(s) 152 will have a field of view 154 that differs from the field of view 116 of the dimensioning system sensor(s) 114. In at least some embodiments, the CPU(s) 260, the processor(s) 220, or a combination of the CPU(s) 260 and processor(s) 220 may execute pre-run time and run time calibration routines to spatially map the visible image data collected by the imaging system image sensor(s) 152 to the depth and intensity data collected by the dimensioning system sensor(s) 114.

The imaging system image sensor(s) 152 can take any of a large variety of forms (e.g., digital, analog, still image, moving image) and can be formed from or contain any number of image capture or collection elements, for example picture elements or "pixels." For example, the imaging system image sensor(s) 152 may have between 1,000,000 pixels (1 MP) and 100,000,000 pixels (100 MP). The visual image data collected, captured or otherwise sensed by the imaging system image sensor(s) 152 may originate as an analog signal that is converted to digital visual image data using one or more internal or external analog-to-digital ("A/D") converters (not shown in FIG. 2). The imaging system image sensor(s) 152 can include any number of current or future developed image sensing devices, collectors, or systems that include, but are not limited to, one or more complementary metal-oxide semiconductor ("CMOS") image sensors or one or more charge-coupled device ("CCD") image sensors.

In some embodiments, the imaging system image sensor(s) 152 may collect, capture, or sense more than one type of data. For example, the imaging system image sensor(s) 152 may acquire visual image data of the scene 101 in the field of view 154 of the imaging system image sensor(s) 152, and/or infrared image data of the scene 101. Where the imaging system image sensor(s) 152 collects, captures, or otherwise senses more than one type of image data, the image data may be organized into one or more data sets, structures, files, or the like. Where the imaging system image sensor(s) 152 collect, capture, or otherwise sense more than one type of data, the data may be collected, captured, or sensed either simultaneously or in an alternating sequence by the imaging system image sensor(s) 152. At least a portion of the visual image data collected by the imaging system image sensor(s) 152 is stored in the form of one or more data sets, structures, or files in the non-transitory, machine-readable storage media 258.

Image data is transferred between the imaging system image sensor(s) 152 and the non-transitory, machine-readable storage media 258 via the first bus controller 262, the second bus controller 276 and the serial or parallel data busses 264, 268. The image data provided by the imaging system image sensor(s) 152 can be stored within the non-transitory, machine-readable storage media 258 in one or more data sets, structures, or files. The non-transitory, machine-readable storage media 258 can have any data storage capacity from about 1 megabyte (1 MB) to about 3 terabytes (3 TB). In some embodiments two or more storage devices may form all or a portion of the non-transitory, machine-readable storage media 258. For example, in some embodiments, the non-transitory, machine-readable storage media 258 may include a non-removable portion including a non-transitory, electro-static, volatile storage medium and a removable portion such as a Secure Digital (SD) card, a compact flash (CF) card, a Memory Stick, or a universal serial bus ("USB") storage device.

Data is transferred between the non-transitory, machine-readable storage media 258 and the CPU(s) 260 via the second bus controller 276 and one or more serial or parallel bi-directional data busses 268. The CPU(s) 260 can include any device comprising one or more cores or independent central processing units that are capable of executing one or more machine executable instruction sets. The CPU(s) 260 can, in some embodiments, include a general purpose processor including, but not limited to, an Intel® Atom® processor, an Intel® Pentium®, Celeron®, or Core 2® processor, and the like. In other embodiments the CPU(s) 260 can include a system-on-chip ("SoC") architecture, including, but not limited to, the Intel® Atom® System on Chip ("Atom SoC") and the like. In other embodiments, the CPU(s) 260 can include a dedicated processor such as an application specific integrated circuit ("ASIC"), a programmable gate array ("PGA" or "FPGA"), a digital signal processor ("DSP"), or a reduced instruction set computer ("RISC") based processor. Where the imaging system 150 is a battery-powered portable system, the CPU(s) 260 can include one or more low power consumption processors, for example Intel® Pentium M®, or Celeron M® mobile system processors or the like, to extend the system battery life.

The imaging system 150 may have one or more discrete graphical processing units ("GPUs"—not shown in FIG. 2) or one or more GPUs integrated into all or a portion of the CPU(s) 260. The CPU(s) 260 or GPU(s) can generate a display image output providing a visible image on the imaging system display(s) 156. The display image output can be routed through the second bus controller 276 to the at least one imaging system display 156. The imaging system display(s) 156 includes at least an output device capable of producing a visible image perceptible to the unaided human eye. In some instances, the display(s) may include a three-dimensional imaging system display 156. In at least some instances, the imaging system display(s) 156 can include or incorporate an input device, for example a resistive or capacitive touch-screen. The imaging system display(s) 156 can include any current or future, analog or digital, two-dimensional or three-dimensional display technology, for example cathode ray tube ("CRT"), light emitting diode ("LED"), liquid crystal display ("LCD"), organic LED ("OLED"), digital light processing ("DLP"), elink, and the like. In at least some embodiments, the imaging system display(s) 156 may be self-illuminating or provided with a backlight such as a white LED to facilitate use of the system 100 in low ambient light environments.

One or more peripheral I/O devices 266 may be communicably coupled to the imaging system 150 to facilitate the receipt of user input by the imaging system 150 via a pointer, a keyboard, a touchpad, or the like. In at least some embodiments the peripheral I/O device(s) 266 may be USB devices that are communicably coupled via a USB bridge to the local bus 274.

Figure 3:
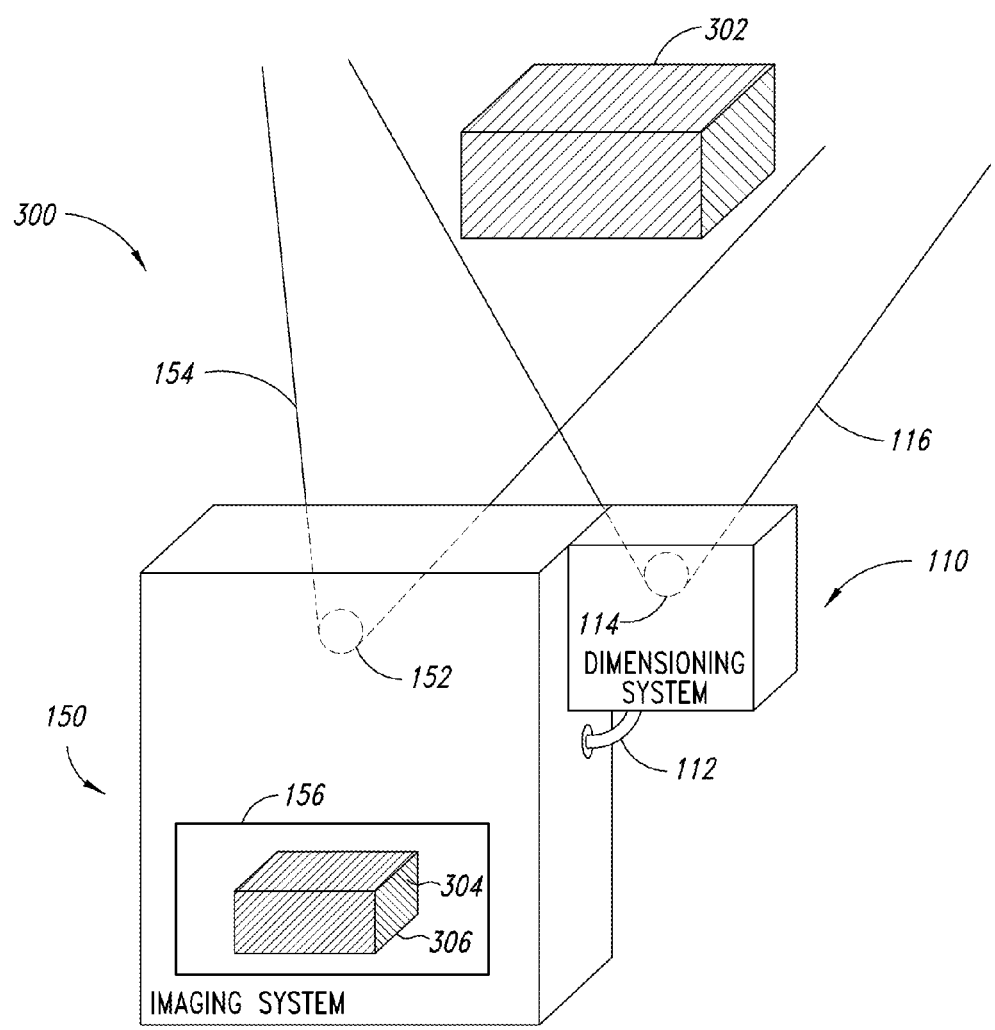
FIG. 3 is a schematic diagram of an example dimensioning system physically and communicably coupled to an example imaging system, with a three-dimensional object placed in the calibrated field of view of the host system camera and the field of view of the dimensioning system sensor.

FIG. 3 shows a system 300 including an example dimensioning system 110 that has been physically and communicably coupled to an imaging system 150. FIG. 3 depicts the run-time operation of the system 300 and includes a depiction of a packaging wireframe model 306 overlaying or superimposed on an image 304 of a three-dimensional object 302 disposed in the field of view 116 of the dimensioning system sensor(s) 114 and/or in the field of view 154 of the imaging system image sensor(s) 152.

In run time mode, the dimensioning system sensor(s) 114 can collect, capture, or otherwise sense depth data corresponding to a depth map and intensity data corresponding to an intensity image of the three-dimensional object 302. Contemporaneously, the imaging system image sensor(s) 152 can collect, capture or otherwise sense visual image data corresponding to a visual image of the three-dimensional object 302. Based on the depth map and intensity image, the processor(s) 220 scale and fit a packaging wireframe model 306 to the three-dimensional object 302. The processor(s) 220, CPU(s) 260, or any combination thereof can superimpose or overlay the packaging wireframe model 306 on the visible image of the three-dimensional object 302 to provide a display image depicting both the image of the three-dimensional object 304 concurrently with the superimposed or overlaid packaging wireframe model 306.

Figure 4:
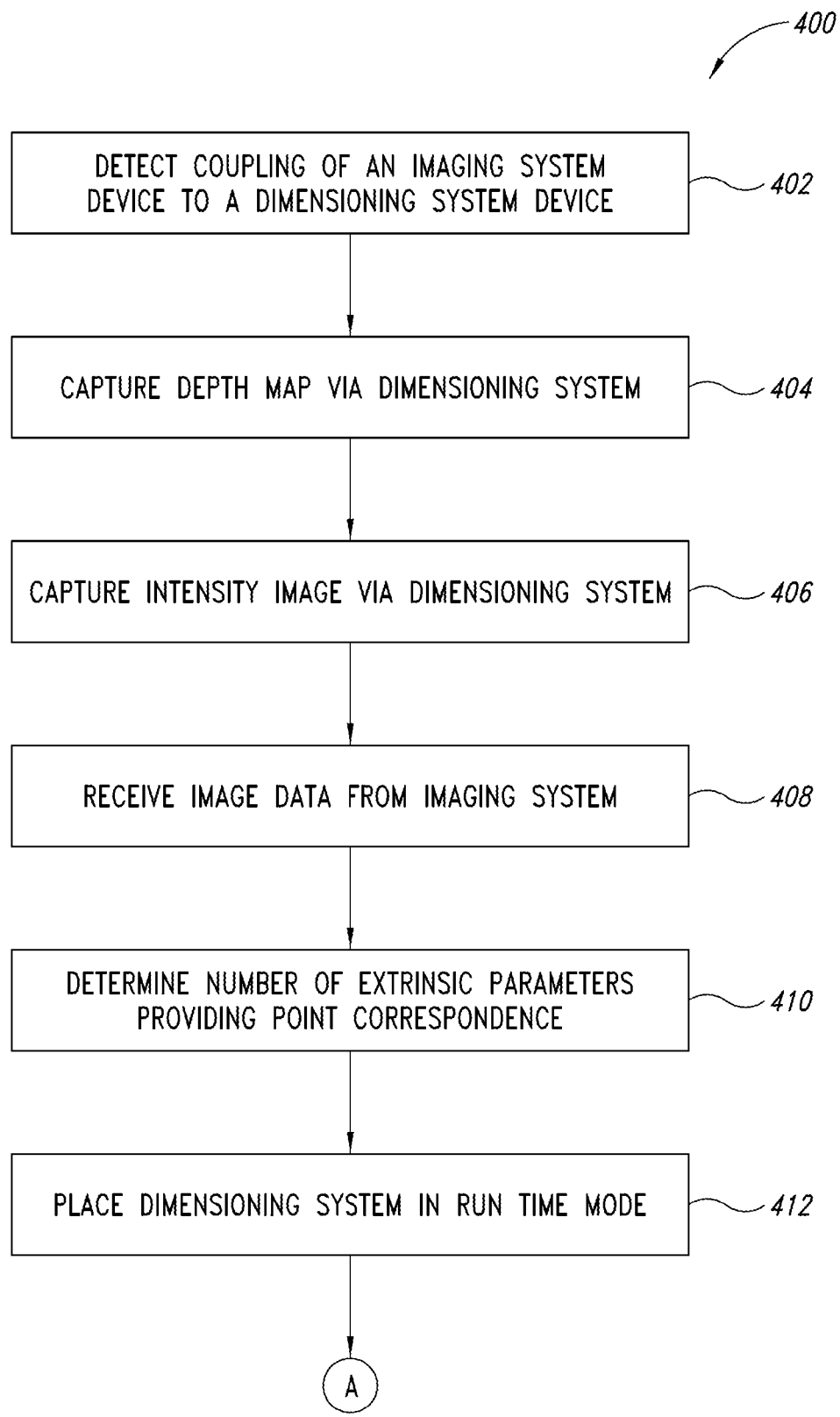
FIG. 4 is a flow diagram of an example pre-run time dimensioning system calibration method using a dimensioning system communicably and physically coupled to an imaging system.

FIG. 4 shows a method 400 of operation of an example illustrative dimensioning system 100 such as the system depicted in FIGS. 1A and 2. In at least some instances, one or more sets of machine executable instructions are executed in pre-run time environment within the dimensioning system 110. The set(s) of machine executable instructions when executed by the one or more processors 220 can determine a number of extrinsic parameters that spatially map or relate one or more three-dimensional points in the field of view 116 of the dimensioning system sensor(s) 114 with the same one or more three-dimensional points in the field of view 154 of the imaging system image sensor(s) 152.

After determining the number of extrinsic parameters in pre-run time mode, the dimensioning system 110 may enter a run time mode. In the run time mode, the dimensioning system 110 scales and fits packaging wireframe models 306 to the three-dimensional objects 302 which appear the field of view 116 of the dimensioning system sensor(s) 114. In at least some instances, the scaled and fitted packaging wireframe models 306 generated by the dimensioning system 110 are displayed overlaid or superimposed on an image of the three-dimensional object 304 by the imaging system display(s) 156.

At 402, the dimensioning system 110 detects the communicable coupling of an imaging system 150, for example by detecting the coupling of the bi-directional data bus(ses) 112 to the imaging system 150. In at least some instances, the dimensioning system 110 may be physically coupled to the imaging system 150 via the one or more physical couplers 230. In at least some instances, the dimensioning system 110 can detect the physical coupling of the imaging system 150. In at least some instances, responsive to the detection of the physical or communicable coupling of the imaging system 150 to the dimensioning system 110, a pre-run time machine executable instruction set may be retrieved from the non-transitory, machine-readable storage media 218 and executed by the processor(s) 220.

At 404, responsive to the execution of the pre-run time machine executable instruction set by the processor(s) 220, the dimensioning system 110 collects, captures or otherwise senses depth data corresponding to a depth image of the scene 101 within the field of view 116 of the dimensioning system sensor(s) 114. In some instances, the scene 101 may not include one or more calibration targets and instead may only contain an image of the environment, area or volume proximate or in a line of sight of the dimensioning system 110. In at least some instances, at least a portion of the depth data acquired by the dimensioning system sensor(s) 114 can include one or more three-dimensional points corresponding to features detectable in the depth map. In some instances, the scene 101 may be illuminated using a structured or modulated light pattern to assist the dimensioning system 110 in capturing depth data to provide the depth map of the scene 101. In some instances, at least one of the exposure or gain of the dimensioning system sensor(s) 114 may be compensated or adjusted when a structured or modulated light pattern assists in the acquisition or collection of depth data to provide the depth map of the scene 101.

At 406, responsive to the execution of the pre-run time machine executable instruction set by the processor(s) 220, the dimensioning system 110 collects, captures or otherwise senses intensity data corresponding to an intensity image of the scene 101 within the field of view 116 of the dimensioning system sensor(s) 114. In some instances the scene 101 may not include one or more calibration targets and instead may only contain an image of the environment, area or volume proximate or in a line of sight of the dimensioning system 110. In at least some instances, at least a portion of the intensity image acquired by the dimensioning system sensor(s) 114 can include one or more three-dimensional points corresponding to features detectable in the intensity image. At least a portion of the three-dimensional points detected by the dimensioning system 110 in the intensity image may correspond to at least a portion of the three-dimensional points detected by the dimensioning system 110 in the depth map data acquired in 404. In some instances, the scene 101 may be illuminated using a structured or modulated light pattern to assist the dimensioning system 110 in capturing intensity data to provide the intensity image of the scene 101. In some instances, at least one of the exposure or gain of the dimensioning system sensor(s) 114 may be compensated or adjusted when a structured or modulated light pattern assists in the acquisition or collection of intensity data to provide the intensity image of the scene 101.

At 408, responsive to the execution of the pre-run time machine executable instructions by the processor(s) 220, the dimensioning system 110 acquires or receives visible image data from the imaging system 150. The visible image data may be collected, captured, or otherwise sensed by the imaging system 150 using the imaging system image sensor(s) 152 and transmitted to the dimensioning system 110 via the bi-directional data bus(ses) 112.

At 410 the processor(s) 220 determines a number of extrinsic parameters spatially mapping one or more three-dimensional points in the depth map and intensity image provided by the dimensioning system 110 to the same one or more three-dimensional points in the visible image provided by the imaging system 150. In at least some instances, the number of extrinsic parameters may be calculated by determining a number of points positioned on or associated with at least one feature detectable in the depth and intensity data provided by the dimensioning system sensor(s) 114 and determining an equal number of respective points similarly positioned on or associated with the at least one feature detectable in the imaging system image data provided by the imaging system image sensor(s) 152.

In some instances, the processor(s) 220 may determine a minimum of eight three-dimensional points positioned on or associated with one or more features detectable in the depth and intensity data. Each of the points identified by the processor(s) 220 in the depth and intensity data may be identified based upon the three-dimensional coordinates ($x_i$, $y_i$, $z_i$) associated with each point. In some instances, the processor(s) 220 may determine an equal number of points similarly positioned on or associated with the at least one feature detectable in the visible image data. Each of the points identified by the processor(s) 220 in the visible image data are identified based upon two-dimensional coordinates ($x_c$, $x_c$) associated with each point. The processor(s) 220 also determine a back focus ($f_c$) of the imaging system image sensor(s) 152.

In at least some instances, at least two of the extrinsic parameters can include a three-dimensional, three-by-three, rotation matrix ($R_{11\text{-}33}$) and a three-dimensional, one-by-three, translation matrix ($T_{0\text{-}2}$) that spatially relate the depth map and intensity image provided by the dimensioning system sensor(s) 114 to the visible image provided by the imaging system image sensor(s) 152.

In at least some embodiments, the components of the rotation and translation matrix are determined using the point correspondence determined by the processor(s) 220 and the known back-focus of the imaging system image sensor(s) 152 using the following relationships:

$$x_c = f_c \frac{R_{11}x_i + R_{12}y_i + R_{13}z_i + T_0}{R_{31}x_i + R_{32}y_i + R_{33}z_i + T_2}$$

$$x_c = f_c \frac{R_{21}x_i + R_{22}y_i + R_{23}z_i + T_1}{R_{31}x_i + R_{32}y_i + R_{33}z_i + T_2}$$

At 412 after successfully determining the number of extrinsic parameters linking the depth map and intensity image provided by the dimensioning system 110 to the visible image provided by the imaging system 150, the dimensioning system 110 may be placed into or otherwise enter a run time mode.

Figure 5:
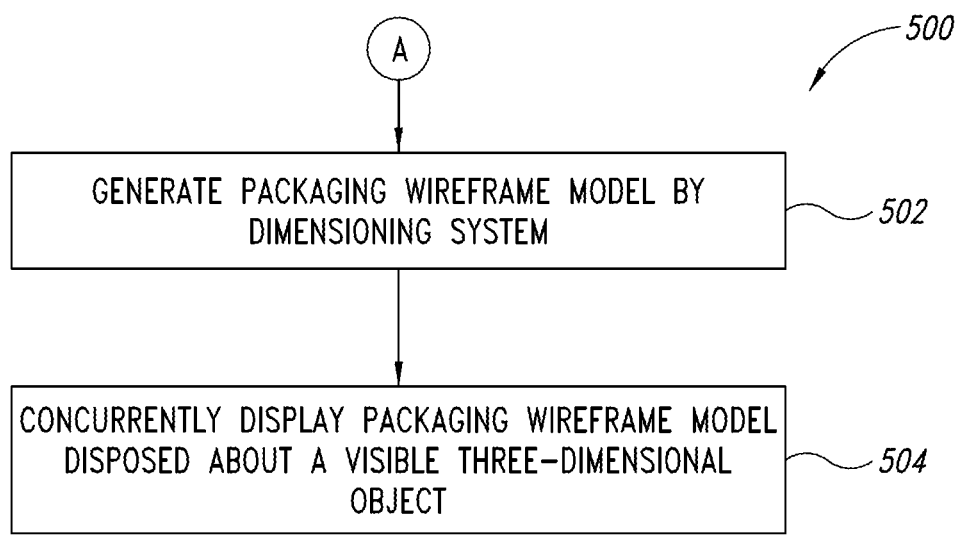
FIG. 5 is a flow diagram of an example run time packaging wireframe model generation method based on the pre-run time calibration method shown in FIG. 4 and including the generation of a packaging wireframe model and the concurrent depiction of the packaging wireframe model about an image of a three-dimensional object.

FIG. 5 shows a method 500 extending from the method 400 and describing one or more additional features of an example dimensioning system 110, such as the dimensioning system 110 depicted in FIGS. 1A and 2. After execution of the pre-run time calibration method 400 (FIG. 4), the dimensioning system 110 may be used to generate packaging wireframe models 306 for concurrent display with images of one or more respective three-dimensional objects 304 on the at least one imaging system display 156.

The pre-run time calibration method 400 (FIG. 4) provides a spatial mapping between the depth map and intensity image acquired by the dimensioning system 110 with the visible image acquired by the imaging system 150 based on the number of extrinsic parameters determined at 410. The determined extrinsic parameters are used by the dimensioning system 110 and the imaging system 150 to provide a display image on the at least one imaging system display 156 that includes the concurrent display of the packaging wireframe model 306 fitted to the boundaries or edges of the image of the three-dimensional object 304.

At 502, the dimensioning system 110 can generate a packaging wireframe model 306 corresponding to the boundaries of a three-dimensional object 302 appearing on the field of view of the dimensioning system sensor(s) 114. The dimensioning system 110 may generate the packaging wireframe model 306 using any shape recognition and wireframe generation algorithm. In at least one instance, upon detecting a presence of a three-dimensional object 302 within the field of view 116 of the dimensioning system sensor(s) 114, the processor(s) 220 select one or more geometric primitives from a library of geometric primitives stored in the non-transitory, machine-readable storage media 218. The processor(s) 220 scale and fit the selected geometric primitive(s) to substantially match, virtually simulate or otherwise encompass the three-dimensional object 302. The processor(s) 220 fit a packaging wireframe model 306 about the one or more scaled and fitted geometric primitives. Due to the previously determined extrinsic parameters, the packaging wireframe model 306 as scaled and fitted to the geometric primitive(s) by the dimensioning system 110 will substantially align with or encompass the boundaries or edges of the image of the three-dimensional object 304 provided by the imaging system 150.

At 504, the imaging system 150 concurrently displays the packaging wireframe model 306 provided by the dimensioning system 110 with the image of the three-dimensional object 304 on the imaging system display(s) 156. In at least some instances, the packaging wireframe model 306 is depicted in a bold or contrasting color to distinguish the packaging wireframe model 306 from the background and the image of the three-dimensional object 304.

Figure 6:
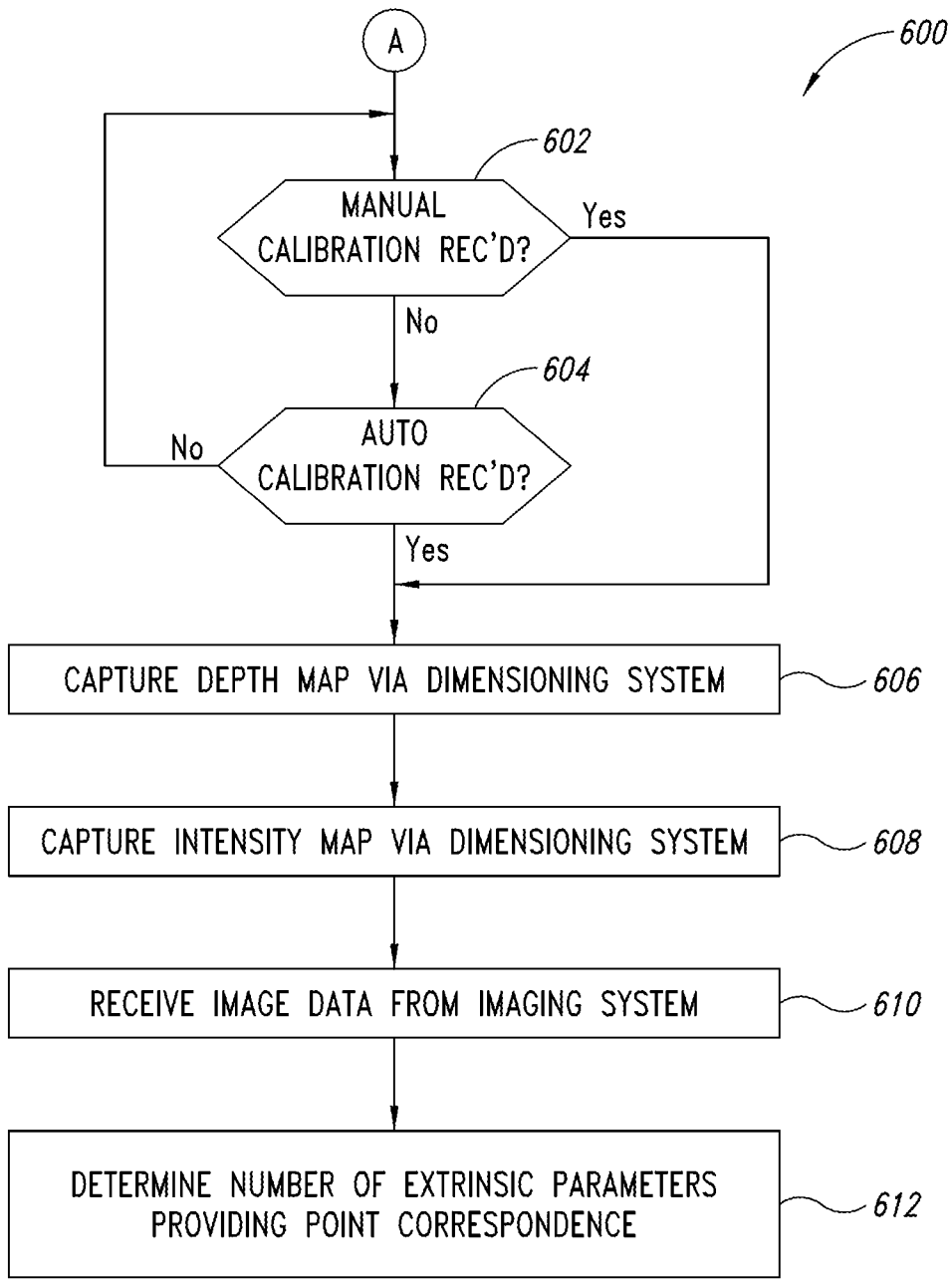
FIG. 6 is a flow diagram of an example run time dimensioning system calibration method based on the pre-run time calibration method shown in FIG. 4.

FIG. 6 shows a method 600 extending from the method 400 and describing one or more additional features of an example system 100, such as the dimensioning system 100 depicted in FIGS. 1A and 2. After concluding the calibration method 400 (FIG. 4) in pre-run time mode, the dimensioning system 110 may periodically recalibrate the dimensioning system sensor(s) 114 to the imaging system sensor(s) 152 during run time operation using a calibration method similar to that described in FIG. 4. In at least some instances, the recalibration may be initiated automatically, for example at a scheduled or predetermined time or periodically, or in response to the detection of an anomaly or change in position of either the dimensioning system 110 or the imaging system 150. In at least some instances, the recalibration of the dimensioning system 110 may be initiated manually, based on an input received by the system 100 that provides an indication of a user's or administrator's desire to recalibrate the dimensioning system 110. Regardless of the method used to initiate the run time calibration method, the system 100 can execute a method similar to that described in FIG. 4 during run time to recalibrate the system.

At 602, the system 100 queries whether a manual run time calibration input has been received by either the dimensioning system 110 or the imaging system 150. If a manual run time calibration input has been received, a run time calibration routine is initiated at 606. If a manual run time calibration input has not been received, at 604 the system 100 queries whether an automatic run time calibration input has been received by either the dimensioning system 110 or the imaging system 150. If an automatic run time calibration input has been received, the run time calibration routine is initiated at 606. If an automatic run time calibration input has not been received, the system 100 continues to query for the receipt of a manual or automatic run time calibration input by either the dimensioning system 110 or the imaging system 150.

At 606, responsive to the receipt of either a manual or an automatic run time calibration input by the dimensioning system 110 or the imaging system 150, the dimensioning system 110 collects, captures, or otherwise senses depth data corresponding to a depth image of the scene 101 within the field of view 116 of the dimensioning system sensor(s) 114. In some instances, the scene 101 may not include one or more calibration targets and instead may only contain a three-dimensional object or an image of the environment, area or volume proximate or in the line of sight of the dimensioning system 110. In at least some instances, at least a portion of the depth data acquired by the dimensioning system sensor(s) 114 can include one or more three-dimensional points corresponding to features detectable in the depth map. In some instances, the scene 101 may be illuminated using a structured or modulated light pattern to assist the dimensioning system 110 in capturing depth data to provide the depth map of the scene 101. In some instances, at least one of the exposure or gain of the dimensioning system sensor(s) 114 may be compensated or adjusted when a structured or modulated light pattern assists in the acquisition or collection of depth data to provide the depth map of the scene 101.

At 608, the dimensioning system 110 collects, captures, or otherwise senses intensity data corresponding to an intensity image of the scene 101 within the field of view 116 of the dimensioning system sensor(s) 114. In some instances the scene 101 may not include one or more calibration targets and instead may only contain a three-dimensional object or an image of the environment, area or volume proximate or in the line of sight of the dimensioning system 110. In at least some instances, at least a portion of the intensity image acquired by the dimensioning system sensor(s) 114 can include one or more three-dimensional points corresponding to features detectable in the intensity image. At least a portion of the three-dimensional points detected by the dimensioning system 110 in the intensity image may correspond to at least a portion of the three-dimensional points detected by the dimensioning system 110 in the depth map data acquired at 606. In some instances, the scene 101 may be illuminated using a structured or modulated light pattern to assist the dimensioning system 110 in capturing intensity data to provide the intensity image of the scene 101. In some instances, at least one of the exposure or gain of the dimensioning system sensor 114 may be compensated or adjusted when a structured or modulated light pattern assists in the acquisition or collection of intensity data to provide the intensity image of the scene 101.

At 610, the dimensioning system 110 acquires or receives visible image data from the imaging system 150. The visible image data is collected, captured or otherwise sensed by the imaging system 150 using the imaging system image sensor(s) 152 and transmitted to the dimensioning system 110 via the bi-directional data bus(ses) 112.

At 612 the dimensioning system processor(s) 220 can determine a number of extrinsic parameters spatially mapping one or more three-dimensional points in the depth map and intensity image provided by the dimensioning system 110 to the same one or more three-dimensional points in the visible image provided by the imaging system 150. In at least some instances, the number of extrinsic parameters may be calculated by determining a number of points positioned on or associated with at least one feature detectable in the depth and intensity data provided by the dimensioning system sensor(s) 114 and determining an equal number of respective points similarly positioned on or associated with the at least one feature detectable in the imaging system image data provided by the imaging system image sensor(s) 152.

In some instances, the processor(s) 220 may determine a minimum of eight three-dimensional points positioned on or associated with one or more features detectable in the depth and intensity data. Each of the points identified by the processor(s) 220 in the depth and intensity data may be identified based upon the three-dimensional coordinates $(x_i, y_i, z_i)$ associated with each point. In some instances, the processor(s) 220 may determine an equal number of points similarly positioned on or associated with the at least one feature detectable in the visible image data. Each of the points identified by the processor(s) 220 in the visible image data are identified based upon two-dimensional coordinates $(x_c, x_c)$ associated with each point. The processor(s) 220 also determine a back focus $(f_c)$ of the imaging system image sensor(s) 152.

In at least some instances, at least two of the extrinsic parameters can include a three-dimensional, three-by-three, rotation matrix $(R_{11-33})$ and a three-dimensional, one-by-three, translation matrix $(T_{0-2})$ that spatially relate the depth map and intensity image provided by the dimensioning system sensor(s) 114 to the visible image provided by the imaging system image sensor(s) 152.

In at least some embodiments, the components of the rotation and translation matrix are determined using the point correspondence determined by the processor(s) 220 and the known back-focus of the imaging system image sensor(s) 152 using the following relationships:

$$x_c = f_c \frac{R_{11}x_i + R_{12}y_i + R_{13}z_i + T_0}{R_{31}x_i + R_{32}y_i + R_{33}z_i + T_2}$$

$$x_c = f_c \frac{R_{21}x_i + R_{22}y_i + R_{23}z_i + T_1}{R_{31}x_i + R_{32}y_i + R_{33}z_i + T_2}$$

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs) or programmable gate arrays. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Various methods and/or algorithms have been described. Some or all of those methods and/or algorithms may omit some of the described acts or steps, include additional acts or steps, combine acts or steps, and/or may perform some acts or steps in a different order than described. Some of the method or algorithms may be implemented in software routines. Some of the software routines may be called from other software routines. Software routines may execute sequentially or concurrently, and may employ a multi-threaded approach.

In addition, those skilled in the art will appreciate that the mechanisms taught herein are capable of being distributed as a program product in a variety of forms, and that an illustrative embodiment applies equally regardless of the particular type of signal bearing non-transitory media used to actually carry out the distribution. Examples of non-transitory signal bearing media include, but are not limited to, the following: recordable type media such as portable disks and memory, hard disk drives, CD/DVD ROMs, digital tape, computer memory, and other non-transitory computer-readable storage media.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A dimensioning system device selectively couplable to an imaging system device that has at least one imaging system image sensor and at least one imaging system display coupled to present display images acquired by the at least one imaging system image sensor, the dimensioning system device comprising:

at least one dimensioning system sensor;
at least one dimensioning system non-transitory processor-readable medium; and
at least one dimensioning system processor communicatively coupled to the at least one dimensioning system non-transitory computer readable medium, where:
in a calibration mode the dimensioning system device:
captures a depth map;
captures an intensity image;
receives imaging system image data display image from the imaging system, the imaging system image data representative of an image captured via the at least one imaging sensor; and
determines a number of extrinsic parameters that provide a correspondence between a three-dimensional point in each of the depth map and the intensity image as viewed by the dimensioning system sensor with a same three-dimensional point viewed by the at least one imaging system image sensor of the imaging system device, including:
determines a number of points positioned on at least one feature in the depth map and the intensity image including:
determines a minimum of at least eight points positioned on at least one feature in the depth map and the intensity image, the at least one feature including an item other than a calibration target; and
determines an equal number of respective points similarly positioned on the at least one feature in the imaging system image data; and
in a run-time mode the dimensioning system device:
generates a packaging wireframe image to be presented by the at least one imaging system display of the imaging system positioned to encompass an object in a display of the image represented by the imaging system image data concurrently presented with the package wireframe image by the at least one imaging system display as correlated spatially therewith based at least in part on the determined extrinsic parameters.

2. The dimensioning system device of claim 1 wherein responsive to the receipt of at least one input when in run-time mode, the dimensioning system device further:
captures a second depth map;
captures a second intensity image;
receives a second display image from the imaging system; and
determines a number of extrinsic parameters that provide a correspondence between a three-dimensional point in each of the second depth map and the second intensity image as viewed by the dimensioning system sensor with a same three-dimensional point viewed by the at least one imaging system image sensor of the imaging system device.

3. The dimensioning system device of claim 1, further comprising:
a timer configured to provide an output at one or more intervals; and
wherein responsive to the at least one output by the timer, the dimensioning system device further:
captures a second depth map;
captures a second intensity image;
receives a second display image from the imaging system; and
determines a number of extrinsic parameters that provide a correspondence between a three-dimensional point in each of the second depth map and the second intensity image as viewed by the dimensioning system sensor with a same three-dimensional point viewed by the at least one imaging system image sensor of the imaging system device.

4. The dimensioning system device of claim 1, further comprising:
a depth lighting system to selectively illuminate an area within a field of view of the dimensioning system sensor, and wherein the dimensioning system device selectively illuminates the area contemporaneous with the capture of the depth map and the capture of the intensity image by the dimensioning system sensor.

5. The dimensioning system device of claim 4 wherein the depth lighting system provides at least one of: a structured light pattern or a modulated light pattern.

6. The dimensioning system device of claim 4, further comprising at least one of:
an automatic exposure control system, and wherein the automatic exposure control system adjusts an exposure of at least one of the depth map and the intensity image contemporaneous with the selective illumination of the area within the field of view of the dimensioning system sensor; and
an automatic gain control system, and wherein the automatic gain control system adjusts a gain of at least one of the depth map and the intensity image contemporaneous with the selective illumination of the area within the field of view of the dimensioning system sensor.

7. The dimensioning system device of claim 1 wherein in response to at least one input when in calibration mode,
the dimensioning system device establishes a correspondence between a three-dimensional point in each of the depth map and the intensity image as viewed by the dimensioning system sensor with a same three-dimensional point viewed by the at least one imaging system image sensor of the imaging system device.

8. The dimensioning system device of claim 7 wherein the at least one imaging system display comprises a display device configured to provide input/output capabilities; and
wherein the at least one input is provided via the imaging system display.

9. A method of operation of a dimensioning system device, the method comprising:
detecting via a dimensioning system sensor communicably coupled to a dimensioning system processor, a selective coupling of an imaging system device to the dimensioning system device, the imaging system including at least one imaging system image sensor and at least one imaging system display;
capturing by the dimensioning system device a depth map via the dimensioning system sensor;
capturing by the dimensioning system device an intensity image via the dimensioning system sensor;
receiving by the dimensioning system device imaging system image data, the imaging system image data representing an image captured by the at least one imaging system image sensor; and
determining by the dimensioning system device a number of extrinsic parameters that provide a correspondence between a point in the depth map and intensity image as viewed by the dimensioning system sensor with a same point as viewed by the at least one imaging system image sensor of the imaging system device including:
determining by the dimensioning system device a number of points positioned on at least one feature in the depth map and the intensity image including:
determining by the dimensioning system device a minimum of at least eight points positioned on at least one feature in the depth map and the intensity image, the at least one feature including an item other than a calibration target; and determining by the dimensioning system device an equal number of respective points similarly positioned on the at least one feature in the imaging system image data.

10. The method of claim 9, further comprising:
generating by the dimensioning system processor a packaging wireframe model for presentation by the at least one imaging system display of the imaging system, the packaging wireframe model positioned to encompass an object in the imaging system image data concurrently presented by the at least one imaging system display and spatially correlated therewith based at least in part on the determined extrinsic parameters.

11. The method of claim 9 wherein the imaging system image sensor includes a known back focus value ($f_c$); and
wherein determining by the dimensioning system processor a number of extrinsic parameters that provide a correspondence between a point in the depth map and intensity image as viewed by the dimensioning system sensor with a same point as viewed by the at least one imaging system image sensor of the imaging system device includes for each of the minimum of at least eight points:
determining by the dimensioning system device a point coordinate location ($x_i$, $y_i$) within the intensity image;
determining by the dimensioning system device a point depth ($z_i$) within the depth map for the determined point coordinate location ($x_i$, $y_i$); and
determining by the dimensioning system device a respective point coordinate location ($x_c$, $y_c$) within the imaging system image data.

12. The dimensioning method of claim 11 wherein determining by the dimensioning system processor a number of extrinsic parameters that provide a correspondence between a point in the depth map and intensity image as viewed by the dimensioning system sensor with a same point as viewed by the at least one imaging system image sensor of the imaging system device further includes:
determining via the dimensioning system device all of the components of a three-by-three, nine component, Rotation Matrix ($R_{11-33}$) and a three element Translation Vector ($T_{0-2}$) that relate the depth map and intensity image to the imaging system image data using the following equations:

$$x_c = f_c \frac{R_{11}x_i + R_{12}y_i + R_{13}z_i + T_0}{R_{31}x_i + R_{32}y_i + R_{33}z_i + T_2}$$

$$y_c = f_c \frac{R_{21}x_i + R_{22}y_i + R_{23}z_i + T_1}{R_{31}x_i + R_{32}y_i + R_{33}z_i + T_2}.$$

13. The method of claim 9 wherein capturing by the dimensioning system device a depth map via the dimensioning system sensor includes:
selectively illuminating an area within a first field of view of the dimensioning system sensor with at least one of a structured light pattern or a modulated light pattern.

14. The dimensioning method of claim 13 wherein capturing by the dimensioning system device at least one of the depth map or the intensity image further includes at least one of:
autonomously adjusting an exposure of the dimensioning system device contemporaneous with the selective illumination of the area within the first field of view of the dimensioning system sensor with at least one of a structured light pattern or a modulated light pattern; and
autonomously adjusting a gain of the dimensioning system device contemporaneous with the selective illumination of the area within the first field of view of the dimensioning system sensor with at least one of a structured light pattern or a modulated light pattern.

15. The dimensioning method of claim 9 wherein determining by the dimensioning system processor a number of extrinsic parameters that provide a correspondence between a point in the depth map and intensity image as viewed by the dimensioning system sensor with a same point as viewed by the at least one imaging system image sensor of the imaging system device includes:
receiving by the dimensioning system device, an input identifying a point located on at least on feature in the depth map and the intensity image; and
receiving by the dimensioning system device, a second input identifying a point similarly located on the at least one feature in the imaging system image data.

16. A method of calibrating a dimensioning system device upon communicably coupling the dimensioning system device to an imaging system including an imaging system display and an imaging system image sensor, the method comprising:
receiving by the dimensioning system device a depth map and an intensity image of a scene provided by a dimensioning system sensor in the dimensioning system device, the depth map and the intensity image including a common plurality of three-dimensional points;
receiving by the dimensioning system device an imaging system image data from the imaging system image sensor, the imaging system image data comprising a plurality of visible points, at least a portion of the plurality of visible points corresponding to at least a portion of the plurality of three-dimensional points;
determining via the dimensioning system device a number of points positioned on at least one feature appearing in the depth map and intensity image with a same number of points similarly positioned on the at least one feature appearing in the imaging system image data, the at least one feature not including a calibration target;
determining by the dimensioning system device a number of extrinsic parameters spatially relating each of the number of points in the depth map and the intensity image with each of the respective, same number of points in the imaging system image data.

17. The method of claim 16, further comprising:
identifying, by the dimensioning system device, at least one three-dimensional object in the depth map and the intensity image;
generating by the dimensioning system device and based at least in part on the determined number of extrinsic parameters, a packaging wireframe for presentation on the imaging system display, the packaging wireframe substantially encompassing the at least one three-dimensional object; and
generating by the dimensioning system device, a composite image signal including the three-dimensional wireframe substantially encompassing an image of the three-dimensional object appearing in the imaging system image data; and
displaying the composite image signal on the imaging system display.

18. The method of claim 16 wherein the imaging system image sensor includes a back focus value ($f_c$); and wherein determining a number of extrinsic parameters spatially relating each of the number of points in the depth map and the intensity image with each of the respective, same number of points in the imaging system image data includes:

determining by the dimensioning system device at least eight points located on at least one feature in the depth map and the intensity image; and determining by the dimensioning system device an equal number of respective points similarly located on the at least one feature in the imaging system image data;

determining by the dimensioning system device for each of the at least eight points a point coordinate location ($x_i$, $y_i$i) within the intensity image;

determining by the dimensioning system device for each of the at least eight points a point depth ($[z]_i$i) within the depth map for the determined point coordinate location ($x_i$, $y_i$i); and determining by the dimensioning system device a respective point coordinate location for each of the at least eight points ($x_c$, $y_c$) within the imaging system image data.

19. The method of claim 18 determining a number of extrinsic parameters spatially relating each of the number of points in the depth map and the intensity image with each of the respective, same number of points in the imaging system image data includes:

determining via the dimensioning system device all of the components of a three-by-three, nine component, Rotation Matrix ($R_{11\text{-}33}$) and a three element Translation Vector ($T_{0\text{-}2}$) that relate the depth map and intensity image to the imaging system image data using the following equations:

$$x_c = f_c \frac{R_{11}x_i + R_{12}y_i + R_{13}z_i + T_0}{R_{31}x_i + R_{32}y_i + R_{33}z_i + T_2}$$

$$y_c = f_c \frac{R_{21}x_i + R_{22}y_i + R_{23}z_i + T_1}{R_{31}x_i + R_{32}y_i + R_{33}z_i + T_2}.$$

* * * * *